US012621563B2

(12) United States Patent
Yoshida

(10) Patent No.: US 12,621,563 B2
(45) Date of Patent: May 5, 2026

(54) LENS APPARATUS, DETACHABLE ATTACHED TO AN IMAGE PICKUP APPARATUS, HAVING A CONTROLLER FOR PERFORMING COMMUNICATION WITH THE IMAGE PICKUP APPARATUS WITH RESPECT TO DRIVING AN OPTICAL

(71) Applicant: CANON KABUSHIKI KAISHA, Tokyo (JP)

(72) Inventor: Yumiko Yoshida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 17/856,513

(22) Filed: Jul. 1, 2022

(65) Prior Publication Data

US 2023/0009822 A1 Jan. 12, 2023

(30) Foreign Application Priority Data

Jul. 7, 2021 (JP) ................................. 2021-112968

(51) Int. Cl.
| | |
|---|---|
| *H04N 23/663* | (2023.01) |
| *G02B 7/09* | (2021.01) |
| *G02B 27/64* | (2006.01) |
| *G03B 17/14* | (2021.01) |
| *G03B 17/56* | (2021.01) |
| *H04N 23/66* | (2023.01) |

(52) U.S. Cl.
CPC ............. *H04N 23/663* (2023.01); *G02B 7/09* (2013.01); *G02B 27/646* (2013.01); *G03B 17/14* (2013.01); *G03B 17/565* (2013.01); *H04N 23/66* (2023.01)

(58) Field of Classification Search
None
See application file for complete search history.

(56) References Cited

U.S. PATENT DOCUMENTS

| | | | | | |
|---|---|---|---|---|---|
| 5,485,208 | A | * | 1/1996 | Mabuchi | ................ G03B 17/14 |
| | | | | | 348/335 |
| 5,978,598 | A | * | 11/1999 | Ishikawa | .................. G03B 5/00 |
| | | | | | 396/50 |
| 6,128,443 | A | * | 10/2000 | Higuma | ................. G03B 17/14 |
| | | | | | 396/137 |

(Continued)

FOREIGN PATENT DOCUMENTS

| | | |
|---|---|---|
| CN | 102890391 A | 1/2013 |
| CN | 102971669 A | 3/2013 |

(Continued)

*Primary Examiner* — Quan Pham
(74) *Attorney, Agent, or Firm* — Canon U.S.A., Inc. IP Division

(57) ABSTRACT

A lens apparatus detachably attached to an image pickup apparatus body includes a controller configured to perform communication with the image pickup apparatus body with respect to driving of an optical member, wherein the controller is configured to transmit, based on first information for identifying the image pickup apparatus body transmitted from the image pickup apparatus body, second information for identifying the lens apparatus to the image pickup apparatus body, and transmit, based on third information for identifying the image pickup apparatus body transmitted from the image pickup apparatus body after transmission of the second information, fourth information for identifying the lens apparatus to the image pickup apparatus body.

18 Claims, 18 Drawing Sheets

(56) References Cited

U.S. PATENT DOCUMENTS

| 2002/0018126 | A1* | 2/2002 | Ikeda | H04N 5/772 |
| | | | | 348/222.1 |
| 2007/0189730 | A1 | 8/2007 | Okamura | |
| 2009/0060486 | A1 | 3/2009 | Higuma | |
| 2013/0028590 | A1* | 1/2013 | Hasuda | G03B 17/566 |
| | | | | 396/530 |
| 2013/0176480 | A1 | 7/2013 | Makigaki | |
| 2016/0006923 | A1* | 1/2016 | Imamura | H04N 23/67 |
| | | | | 348/208.11 |
| 2018/0157152 | A1 | 6/2018 | Ajito | |
| 2018/0224721 | A1 | 8/2018 | Pan | |
| 2019/0285967 | A1* | 9/2019 | Himei | H04N 23/68 |
| 2020/0041876 | A1 | 2/2020 | Sugiyama | |

FOREIGN PATENT DOCUMENTS

| CN | 105323471 | A | 2/2016 |
| JP | 2003158666 | A | 5/2003 |
| JP | 2009053523 | A | 3/2009 |
| JP | 2020 064301 | A | 4/2020 |

* cited by examiner

FIG.4A

| LENS APPARATUS TRANSMISSION DATA | | DATA CONTENT | IMAGING APPARATUS BODY TRANSMISSION DATA | DATA CONTENT | COMMUNICATION ORDER |
|---|---|---|---|---|---|
| INFORMATION A | — | — | INFORMATION A1 | POWER SUPPLY LEVEL | 1 |
| | — | — | INFORMATION A2 | CONFORMANCE TO DRIVE COMMAND A | 2 |
| | INFORMATION A1 | WHETHER DIAPHRAGM DRIVING IS POSSIBLE | — | — | 3 |
| | INFORMATION A2 | WHETHER ZOOM DRIVING IS POSSIBLE | — | — | 4 |
| | INFORMATION A3 | WHETHER FOCUS DRIVING IS POSSIBLE | — | — | 5 |
| | INFORMATION A4 | WHETHER AF/MF SWITCH STATUS CAN BE TRANSMITTED | — | — | 6 |
| INFORMATION B | INFORMATION B1 | CONFORMANCE TO IMAGING APPARATUS BODY C | INFORMATION B1 | CONFORMANCE TO DRIVE COMMAND B | 7 |
| | INFORMATION B2 | WHETHER DIAPHRAGM DRIVING IS POSSIBLE/ WHETHER DRIVE LIMITATION IS PRESENT | — | — | 8 |
| | INFORMATION B3 | WHETHER ZOOM DRIVING IS POSSIBLE/ WHETHER DRIVE LIMITATION IS PRESENT | — | — | 9 |
| | INFORMATION B4 | WHETHER FOCUS DRIVING IS POSSIBLE/ WHETHER DRIVE LIMITATION IS PRESENT | — | — | 10 |

FIG.4B

| IMAGING APPARATUS BODY TRANSMISSION DATA | | DATA CONTENT | IMAGING APPARATUS BODY A | IMAGING APPARATUS BODY B | IMAGING APPARATUS BODY C |
|---|---|---|---|---|---|
| INFORMATION A | INFORMATION A1 | POWER SUPPLY LEVEL | HIGH | LOW | LOW |
| | INFORMATION A2 | CONFORMANCE TO DRIVE COMMAND A | CONFORMED | NOT CONFORMED | NOT CONFORMED |
| INFORMATION B | INFORMATION B1 | CONFORMANCE TO DRIVE COMMAND B | NOT CONFORMED | NOT CONFORMED | CONFORMED |

FIG.4C

| | LENS APPARATUS TRANSMISSION DATA | DATA CONTENT | INITIAL TRANSMISSION | TRANSMISSION TO IMAGING APPARATUS BODY A | TRANSMISSION TO IMAGING APPARATUS BODY B | TRANSMISSION TO IMAGING APPARATUS BODY C |
|---|---|---|---|---|---|---|
| INFORMATION A | INFORMATION A1 | WHETHER DIAPHRAGM DRIVING IS POSSIBLE | NOT POSSIBLE | POSSIBLE | NOT POSSIBLE | POSSIBLE |
| | INFORMATION A2 | WHETHER ZOOM DRIVING IS POSSIBLE | NOT POSSIBLE | POSSIBLE | NOT POSSIBLE | POSSIBLE |
| | INFORMATION A3 | WHETHER FOCUS DRIVING IS POSSIBLE | NOT POSSIBLE | POSSIBLE | NOT POSSIBLE | POSSIBLE |
| | INFORMATION A4 | WHETHER AF/MF SWITCH STATUS CAN BE TRANSMITTED | NOT POSSIBLE | POSSIBLE | NOT POSSIBLE | POSSIBLE |
| INFORMATION B | INFORMATION B1 | CONFORMANCE TO IMAGING APPARATUS BODY C | NOT CONFORMED | CONFORMED | CONFORMED | CONFORMED |
| | INFORMATION B2 | WHETHER DIAPHRAGM DRIVING IS POSSIBLE/ WHETHER DRIVE LIMITATION IS PRESENT | NOT POSSIBLE | POSSIBLE | NOT POSSIBLE | POSSIBLE |
| | INFORMATION B3 | WHETHER ZOOM DRIVING IS POSSIBLE/ WHETHER DRIVE LIMITATION IS PRESENT | NOT POSSIBLE | POSSIBLE | NOT POSSIBLE | PRESENT |
| | INFORMATION B4 | WHETHER FOCUS DRIVING IS POSSIBLE/ WHETHER DRIVE LIMITATION IS PRESENT | NOT POSSIBLE | POSSIBLE | NOT POSSIBLE | PRESENT |

FIG.9A

|  | IMAGING APPARATUS BODY A | IMAGING APPARATUS BODY B | IMAGING APPARATUS BODY C |
|---|---|---|---|
| Iris | ○ | × | ○ |
| Zoom | ○ | × | △ |
| Focus | ○ | × | △ |
| IsShift | × | × | × |
| IsMloc | × | × | × |

FIG.9B

|  | IMAGING APPARATUS BODY A | IMAGING APPARATUS BODY B | IMAGING APPARATUS BODY C |
|---|---|---|---|
| Iris | ○ | ○ | ○ |
| Zoom | ○ | ○ | △ |
| Focus | ○ | × | △ |
| IsShift | ○ | ○ | ○ |
| IsMloc | ○ | ○ | × |

FIG.10A

| STATE | POWER ON | IS ON | IS OFF | POWER OFF |
|---|---|---|---|---|
| IsShift | — | IMAGE STABILIZATION | INITIAL POSITION | — |
| IsMloc | FOLLOW IS SW | UNLOCK | LOCK | LOCK |

FIG.10B

| STATE | POWER ON | IS ON | IS OFF | POWER OFF |
|---|---|---|---|---|
| IsShift | — | IMAGE STABILIZATION | INITIAL POSITION | — |
| IsMloc | UNLOCK | UNLOCK | UNLOCK | LOCK |

| LENS APPARATUS TRANSMISSION DATA | | DATA CONTENT | IMAGING APPARATUS BODY TRANSMISSION DATA | DATA CONTENT | COMMUNICATION ORDER |
|---|---|---|---|---|---|
| INFORMATION A | — | — | INFORMATION A1 | POWER SUPPLY LEVEL | 1 |
| | — | — | INFORMATION A2 | CONFORMANCE TO DRIVE COMMAND A | 2 |
| | INFORMATION A1 | WHETHER DIAPHRAGM DRIVING IS POSSIBLE | — | — | 3 |
| | INFORMATION A2 | WHETHER ZOOM DRIVING IS POSSIBLE | — | — | 4 |
| | INFORMATION A3 | WHETHER FOCUS DRIVING IS POSSIBLE | — | — | 5 |
| | INFORMATION A4 | WHETHER AF/MF SWITCH STATUS CAN BE TRANSMITTED | — | — | 6 |
| INFORMATION B | INFORMATION B1 | CONFORMANCE TO IMAGING APPARATUS BODY C | INFORMATION B1 | CONFORMANCE TO DRIVE COMMAND B | 7 |
| | INFORMATION B2 | WHETHER DIAPHRAGM DRIVING IS POSSIBLE/ WHETHER DRIVE LIMITATION IS PRESENT | — | — | 8 |
| | INFORMATION B3 | WHETHER ZOOM DRIVING IS POSSIBLE/ WHETHER DRIVE LIMITATION IS PRESENT | — | — | 9 |
| | INFORMATION B4 | WHETHER FOCUS DRIVING IS POSSIBLE/ WHETHER DRIVE LIMITATION IS PRESENT | — | — | 10 |

FIG.15B

| IMAGING APPARATUS BODY TRANSMISSION DATA | | DATA CONTENT | IMAGING APPARATUS BODY A | IMAGING APPARATUS BODY B | IMAGING APPARATUS BODY C |
|---|---|---|---|---|---|
| INFORMATION A | INFORMATION A1 | POWER SUPPLY LEVEL | HIGH | LOW | LOW |
| | INFORMATION A2 | CONFORMANCE TO DRIVE COMMAND A | CONFORMED | NOT CONFORMED | NOT CONFORMED |
| INFORMATION B | INFORMATION B1 | CONFORMANCE TO DRIVE COMMAND B | NOT CONFORMED | NOT CONFORMED | CONFORMED |

FIG.15C

| | LENS APPARATUS TRANSMISSION DATA | DATA CONTENT | INITIAL TRANSMISSION | TRANSMISSION TO IMAGING APPARATUS BODY A | TRANSMISSION TO IMAGING APPARATUS BODY B | TRANSMISSION TO IMAGING APPARATUS BODY C |
|---|---|---|---|---|---|---|
| INFORMATION A | INFORMATION A1 | WHETHER DIAPHRAGM DRIVING IS POSSIBLE | NOT POSSIBLE | POSSIBLE | NOT POSSIBLE | POSSIBLE |
| | INFORMATION A2 | WHETHER ZOOM DRIVING IS POSSIBLE | NOT POSSIBLE | POSSIBLE | NOT POSSIBLE | POSSIBLE |
| | INFORMATION A3 | WHETHER FOCUS DRIVING IS POSSIBLE | NOT POSSIBLE | POSSIBLE | NOT POSSIBLE | POSSIBLE |
| | INFORMATION A4 | WHETHER AF/MF SWITCH STATUS CAN BE TRANSMITTED | NOT POSSIBLE | NOT POSSIBLE | NOT POSSIBLE | NOT POSSIBLE |
| INFORMATION B | INFORMATION B1 | CONFORMANCE TO IMAGING APPARATUS BODY C | NOT CONFORMED | CONFORMED | CONFORMED | CONFORMED |
| | INFORMATION B2 | WHETHER DIAPHRAGM DRIVING IS POSSIBLE/ WHETHER DRIVE LIMITATION IS PRESENT | NOT POSSIBLE | POSSIBLE | NOT POSSIBLE | POSSIBLE |
| | INFORMATION B3 | WHETHER ZOOM DRIVING IS POSSIBLE/ WHETHER DRIVE LIMITATION IS PRESENT | NOT POSSIBLE | POSSIBLE | NOT POSSIBLE | PRESENT |
| | INFORMATION B4 | WHETHER FOCUS DRIVING IS POSSIBLE/ WHETHER DRIVE LIMITATION IS PRESENT | NOT POSSIBLE | POSSIBLE | NOT POSSIBLE | PRESENT |

LENS APPARATUS, DETACHABLE ATTACHED TO AN IMAGE PICKUP APPARATUS, HAVING A CONTROLLER FOR PERFORMING COMMUNICATION WITH THE IMAGE PICKUP APPARATUS WITH RESPECT TO DRIVING AN OPTICAL

BACKGROUND

Field

The aspect of the embodiments relates to a lens apparatus, an image pickup apparatus, an image pickup apparatus body, and a storage medium.

Description of the Related Art

A conventional imaging apparatus (also referred to as an image pickup apparatus) is known to include an imaging apparatus body (also referred to as an image pickup apparatus body or a camera body) and an interchangeable lens apparatus. In the imaging apparatus, information in the interchangeable lens apparatus is transmitted to the imaging apparatus body, and, based on the information, the imaging apparatus body transmits commands for driving optical members in the interchangeable lens apparatus to the interchangeable lens apparatus.

When a new function is appended to the imaging apparatus, in one embodiment, the new function is implemented in a case where both of the imaging apparatus body and the interchangeable lens apparatus support the new function and at the same time the imaging apparatus has compatibility with the conventional apparatus that does not support the new function. Japanese Patent Application Laid-Open No. 2009-53523 discusses an imaging apparatus that has a newly appended function while maintaining compatibility with a conventional apparatus.

To maintain compatibility with the conventional apparatus, communication between the imaging apparatus body and the interchangeable lens apparatus that both support the new function can be firstly implemented by transmission and reception of information in accordance with the conventional rules that do not define the new function. Thus, because the interchangeable lens apparatus cannot identify the imaging apparatus body through the transmission and reception of the information, the new function thus cannot be implemented.

SUMMARY

A lens apparatus detachably attached to an image pickup apparatus body includes an optical member, and a controller configured to perform communication with the image pickup apparatus body with respect to driving of the optical member, wherein the controller is configured to transmit, based on first information for identifying the image pickup apparatus body transmitted from the image pickup apparatus body, second information for identifying the lens apparatus to the image pickup apparatus body, and transmit, based on third information for identifying the image pickup apparatus body transmitted from the image pickup apparatus body after transmission of the second information, fourth information for identifying the lens apparatus to the image pickup apparatus body.

Further features of the present invention will become apparent from the following description of exemplary embodiments with reference to the attached drawings.

BRIEF DESCRIPTION OF THE DRAWINGS

FIGS. 4A, 4B, and 4C illustrate examples of information to be transmitted in initial communication according to the first exemplary embodiment.

FIGS. 9A and 9B illustrate examples of driving of optical members for each type of the imaging apparatus body according to the first exemplary embodiment.

FIGS. 10A and 10B illustrate examples of state transitions of an image stabilizing lens and a lock mechanism according to the first exemplary embodiment.

FIG. 11 illustrates examples of respective configurations of a control unit in a lens apparatus and a control unit in an imaging apparatus body according to a second exemplary embodiment.

FIG. 14 illustrates examples of respective configurations of a control unit in a lens apparatus, a control unit in an adapter apparatus, and a control unit in an imaging apparatus body according to the third exemplary embodiment.

FIGS. 15A, 15B, and 15C illustrate examples of information to be transmitted in initial communication according to the third exemplary embodiment.

DESCRIPTION OF THE EMBODIMENTS

Figure 1:
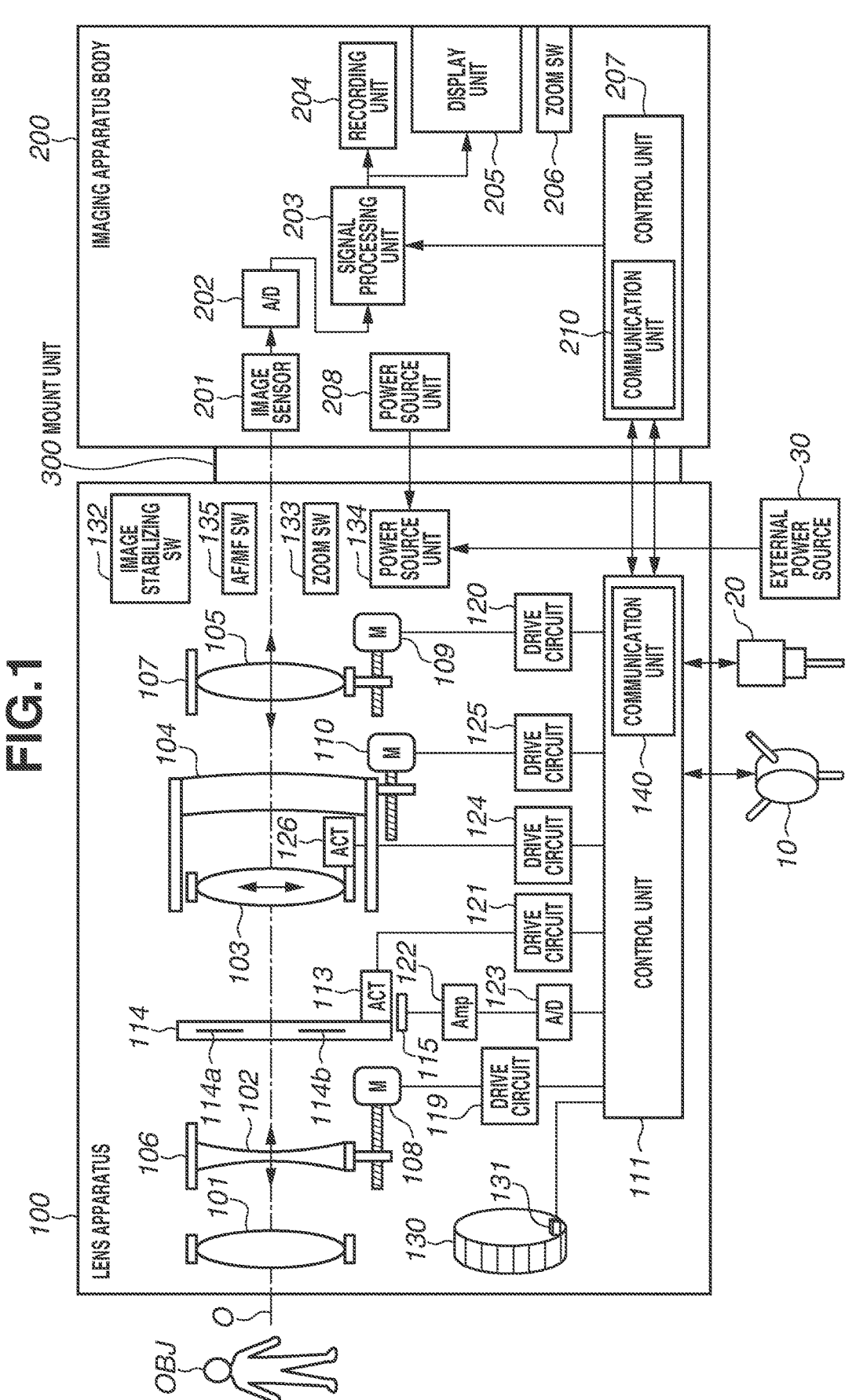
FIG. 1 illustrates an example of a configuration of an imaging apparatus according to a first exemplary embodiment.

Exemplary embodiments of the disclosure will be described below with reference to the accompanying drawings. Throughout all of the drawings for illustrating exemplary embodiments, as a rule (unless otherwise specifically described), identical members are assigned the same reference numerals and redundant descriptions thereof will be omitted.

<Configuration of Imaging Apparatus>

FIG. 1 illustrates an example of a configuration of an imaging apparatus according to a first exemplary embodiment. Referring to FIG. 1, a lens apparatus 100 is an interchangeable lens apparatus attachable to and detachable from an imaging apparatus body 200. The lens apparatus 100 includes optical members, i.e., a lens unit (lens group) 101, a movable lens unit 102 for zooming, and a diaphragm unit (aperture diaphragm) 114 for adjusting light quantity, that are arranged in this order from the side of a subject OBJ. The lens apparatus 100 further includes an image stabilizing lens unit 103 that corrects (reduces) an image shake caused by the shake of the lens apparatus 100 such as a camera shake, and a lock mechanism 104 (fixing mechanism or limiting mechanism) that holds (fixes or limits) the lens unit 103 at the initial position. The lens apparatus 100 includes a focus lens unit 105 for focusing (focus adjustment). The image stabilizing lens unit 103 can also function as a movable lens unit for zooming.

The zoom lens unit 102 and the focus lens unit 105 are held by holding members 106 and 107, respectively. The holding members 106 and 107 are movably guided along an optical axis O, and driven by drive units 108 and 109, respectively. The drive units 108 and 109 each include a stepping motor and drive the zoom lens unit 102 and the focus lens unit 105, respectively, in synchronization with a drive pulse. The image stabilizing lens unit 103 is movably guided in a driving direction perpendicular to the optical axis O and then driven by a drive unit 126 (also referred to as a drive device or an actuator). The lock mechanism 104 is brought into a locked state and an unlocked state by the drive unit 110. The drive unit 110 includes, for example, a stepping motor and enables the lock mechanism 104 to maintain in the locked state or the unlocked state by using detent torque (self-holding force) at a stable position, without using power. A drive unit circuit 125 (driver) is a circuit that drives the drive unit 110.

A control unit 111 (also referred to as a controller or a lens microcomputer) controls the operation of each unit in the lens apparatus 100. The control unit 111 includes a communication unit 140 and receives a driving command and a transmission request command transmitted from the imaging apparatus body 200 via the communication unit 140. The control unit 111 controls driving of the optical members based on the driving command and transmits information stored in the lens apparatus 100 to the imaging apparatus body 200 based on the transmission request command.

When the lens apparatus 100 is activated, the communication unit 140 transmits information for identifying the lens apparatus 100 and information about functions supported by the lens apparatus 100 to a communication unit 210 in the imaging apparatus body 200. The communication unit 210 transmits information for identifying the imaging apparatus body 200 and information about functions supported by the imaging apparatus body 200 to the communication unit 140 in the lens apparatus 100. For example, such initial communication enables the imaging apparatus body 200 and the lens apparatus 100 to exchange each other's information that is used, for example, for driving the optical members of the lens apparatus 100.

The initial communication will be described in detail below.

The diaphragm unit 114 can include, for example, diaphragm blades 114a and 114b.

The respective states of the diaphragm blades 114a and 114b are detected, for example, by a detection unit 115 including a Hall element and detection signals are input to the control unit 111 via an amplifier 122 and an analog-to-digital (A/D) converter 123. The control unit 111 outputs a drive signal based on the detection signals from the A/D converter 123, and a drive circuit 121 drives an actuator 113

(also referred to as a drive unit or a drive device) based on the drive signal. The actuator 113 drives the diaphragm unit 114 in this way, and adjustment of the light quantity is implemented as a result.

The lens apparatus 100 includes an operation ring 130, an operation amount detection unit 131, an image stabilizing switch 132, and a zoom switch 133. The operation amount detection unit 131 can include, for example, two photo-interrupters (encoders) that output two-phase signals according to the rotation of the operation ring 130, and detects the operation amount of the operation ring 130. The image stabilizing switch 132 can be, for example, a sliding switch, and is used to switch the operation of the image stabilizing lens unit 103 between an ON state and an OFF state. The zoom switch 133 can be, for example, a seesaw switch, and is used to drive the zoom lens unit 102. Pieces of information about the operation amount of the operation ring 130, the state of the image stabilizing switch 132, and the state of the zoom switch 133 are input to the control unit 111. The control unit 111 can transmit the operation amount of the operation ring 130 to a control unit 207 in the imaging apparatus body via the communication unit 140.

The operation target to be operated by the operation ring 130 can be changed based on the settings of the imaging apparatus body 200. For example, the operation target can include the aperture diaphragm, focus, zoom, and shutter speed.

The operation target may be set by using a switch and a display unit 205 (display) provided on the imaging apparatus body 200. The control unit 207 of the imaging apparatus body 200 generates a driving command based on the operation amount of the operation ring 130 received from the control unit 111 of the lens apparatus 100, and transmits the driving command to the control unit 111. The control unit 111 controls driving of the set operation target based on the received driving command. In a case where the shutter speed is set as the operation target of the operation ring 130, the control unit 207 adjusts the shutter speed based on the operation amount of the operation ring 130 received from the control unit 111.

As the zoom switch 133, a known switch that can operate the drive speed and drive direction of the zoom lens unit 102 can be used. The control unit 111 drives the actuator 126 (that can include a voice coil motor) via a drive circuit 124 based on the shake of the imaging apparatus detected by a shake sensor such as a vibration gyro. When the image stabilizing switch 132 is set to ON, the control unit 111 performs image stabilizing control. On the other hand, when the image stabilizing switch is set to OFF, the control unit 111 does not perform image stabilizing control. An automatic focus/manual focus (AF/MF) switch 135 is used to switch between the AF state and the MF state.

In the AF state, the focus lens unit 105 is driven based on a driving command from the imaging apparatus body 200. In the MF state, the focus lens unit 105 is operated by the operation ring 130 provided on the lens apparatus 100 and a (remote) focus controller 10 (e.g., a focus demand) The status of the AF/MF switch 135 is detected by the control unit 111, and the status information is transmitted to the imaging apparatus body 200 via the communication unit 140. The control unit 207 determines whether the imaging apparatus body 200 can control the driving of the focus lens unit 105, i.e., AF control, based on the information.

The focus controller 10 and a (remote) zoom controller 20 (e.g., a zoom demand) can be connected to the lens apparatus 100. The focus controller 10 includes a rotary operation member (e.g., a knob) and outputs a driving command for driving the focus lens unit 105 based on the operation amount of the operation member, to the lens apparatus 100. The zoom controller 20 includes a seesaw operation member and outputs a driving command for driving the zoom lens unit 102 based on the operation amount of the operation member, to the lens apparatus 100. The control unit 111 outputs a drive signal to a corresponding one of the drive circuits 119 and 120 based on the driving command to cause the drive unit 108 or 109 to operate. Thus, a zoom operation is performed by the zoom lens unit 102, and a focus operation is performed by the focus lens unit 105.

The imaging apparatus body 200 includes an image sensor 201, e.g., a charge coupled device (CCD) sensor or a complementary metal oxide semiconductor (CMOS) sensor, an A/D converter 202, a signal processing unit 203, a recording unit 204, the display unit 205, and a zoom switch 206. The imaging apparatus body 200 includes the control unit (also referred to as a controller or a camera microcomputer) 207, the communication unit 210, and a power source unit 208. An (optical) image of the subject OBJ is captured by the image sensor 201, and the image of the subject OBJ is displayed by the display unit 205. Reflected light from the subject OBJ is incident to the image sensor 201 via the lens unit 101, the zoom lens unit 102, the diaphragm unit 114, the image stabilizing lens unit 103, and the focus lens unit 105. The image sensor 201 captures, i.e., photoelectrically converts, an image formed via the optical system of the lens apparatus 100 and outputs an electrical signal (analog signal). The A/D converter 202 converts the analog signal into a digital signal. The image sensor 201 includes a phase-difference sensor. Phase difference information corresponding to the defocus amount acquired by the phase-difference sensor is input to the signal processing unit 203 via the A/D converter 202. The signal processing unit 203 performs various types of image processing based on the digital signal from the A/D converter 202 to generate a video image signal. The signal processing unit 203 also generates information about the contrast of the video image signal, the defocus amount based on the phase-difference information, and the luminance of the video image signal. The signal processing unit 203 outputs the video image signal to the display unit 205, and the display unit 205 displays a live view image based on the video image signal.

The zoom switch 206 of the imaging apparatus body 200 can be a push type switch. The control unit 207 generates a driving command for driving the zoom lens unit 102 based on the operation of the zoom switch 206, and transmits the driving command to the control unit 111. The driving speed of the zoom lens unit 102 which is based on the operation of the zoom switch 206 can be set by using a switch and the display unit 205 (display) provided on the imaging apparatus body 200. The control unit 111 outputs a driving signal based on the driving command to the drive circuit 119 to cause the drive unit 108 to operate.

The control unit 207 transmits a driving command for the aperture diaphragm based on the luminance information and an AF driving command based on the contrast information and the phase-difference information to the control unit 111 via the communication unit 210. The control unit 207 can adjust the light quantity by determining a combination of the shutter speed of the imaging apparatus body 200 and the aperture value of the diaphragm unit 114 of the lens apparatus 100 based on the luminance information. A focus adjustment operation can be performed by generating a driving command for driving the focus lens unit 105 such that the defocus amount is set to zero based on the sensitivity (depending on the focal length and object distance) and the defocus amount of the focus lens unit 105. The control unit 111 outputs a driving signal based on the driving command to the drive circuit 120 to cause the drive unit 109 to operate. The control unit 111 can control driving of the corresponding optical member based on a driving command that is based on the operation amount of the operation ring 130 or the operation of the zoom switch 206.

<Communication Between Imaging Apparatus Body and Lens Apparatus>

The lens apparatus 100 and the imaging apparatus body 200 mutually communicate each other to exchange commands and information via a communication terminal provided on a mount unit 300. For example, in the initial communication, the lens apparatus 100 and the imaging apparatus body 200 confirm respective commands that they support. After the confirmation, commands supported by the lens apparatus 100 are transmitted from the communication unit 210 to the communication unit 140. An operation for confirming commands between the lens apparatus 100 and the imaging apparatus body 200 will be described below.

<Power Supply>

The lens apparatus 100 and the imaging apparatus body 200 are mechanically and electrically connected with each other via the mount unit 300. A power source unit 134 of the lens apparatus 100 acquires power source (electric power) from the power source unit 208 of the imaging apparatus body 200 via a power source terminal provided on the mount unit 300, and supplies power to each unit (each drive unit and the control unit 111) in the lens apparatus 100. The imaging apparatus body 200 cannot supply power sufficient to simultaneously (concurrently) drive all of the drive units of the lens apparatus 100, depending on the type of the imaging apparatus body 200. According to the first exemplary embodiment, an imaging apparatus body capable of supplying power to simultaneously drive all of the drive units of the lens apparatus 100 is referred to as an imaging apparatus body A. An imaging apparatus body that cannot supply power to simultaneously drive all of the drive units and does not conform to the driving command for each drive unit is referred to as an imaging apparatus body B. An imaging apparatus body that cannot supply power to simultaneously drive all of the drive units but conforms to the driving command for each drive unit is referred to as an imaging apparatus body C.

When an external power source 30 is connected to the lens apparatus 100, power to simultaneously drive all of the drive units can be acquired therefrom regardless of the type of the imaging apparatus body 200.

The lens apparatus 100 determines information to be transmitted to the imaging apparatus body 200 according to the type of the imaging apparatus body 200, and transmits the information to the imaging apparatus body 200. The lens apparatus 100 is to control driving of the drive units according to the supplied power. The determination of the information and the drive control will be described in detail below.

Figure 2:
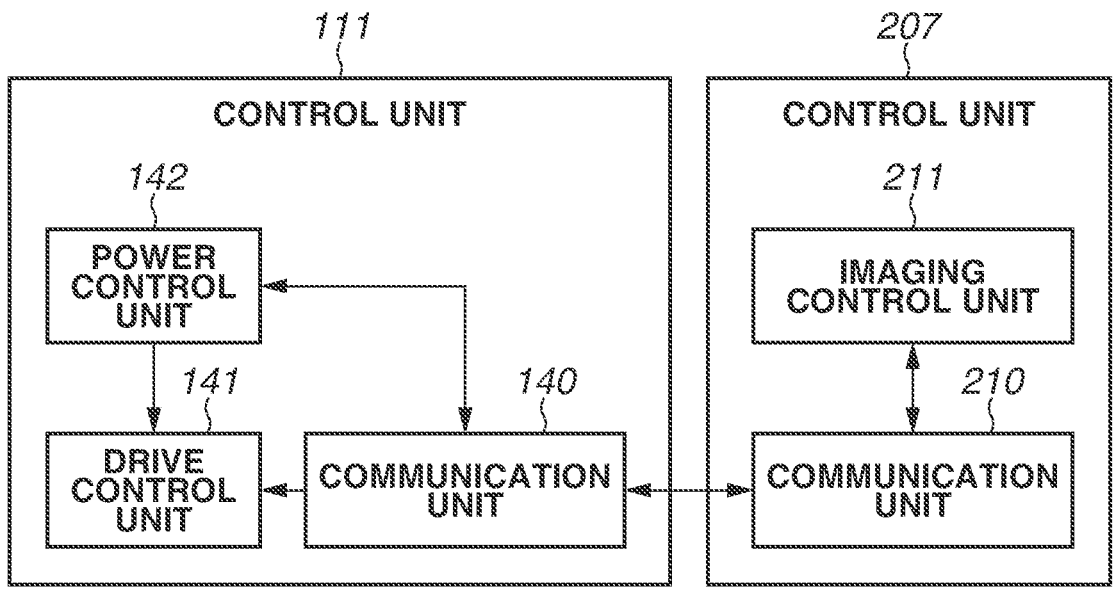
FIG. 2 illustrates examples of respective configurations of a control unit in a lens apparatus and a control unit in an imaging apparatus body according to the first exemplary embodiment.

FIG. 2 illustrates examples of configurations of the control unit 111 in the lens apparatus 100 and the control unit 207 in the imaging apparatus body 200. The control unit 111 includes the communication unit 140, a drive control unit 141, and a power control unit 142. The drive control unit 141 generates a driving command based on an output from the power control unit 142 (described below). The power control unit 142 selects a drive mode (described below) according to the configuration of the imaging apparatus and performs power control (control of power used for driving) according to the selected drive mode. The control unit 207 includes the communication unit 210 and an imaging control unit 211. The imaging control unit 211 performs control related to image capturing, such as determination of the above-described combination of the shutter speed and the aperture value of the diaphragm unit 114, generation of a focus correction amount in (i.e., a driving command for) the AF operation, and generation of a driving command based on the operation of the zoom switch 206.

<Clock Synchronization Communication>

Figure 3:
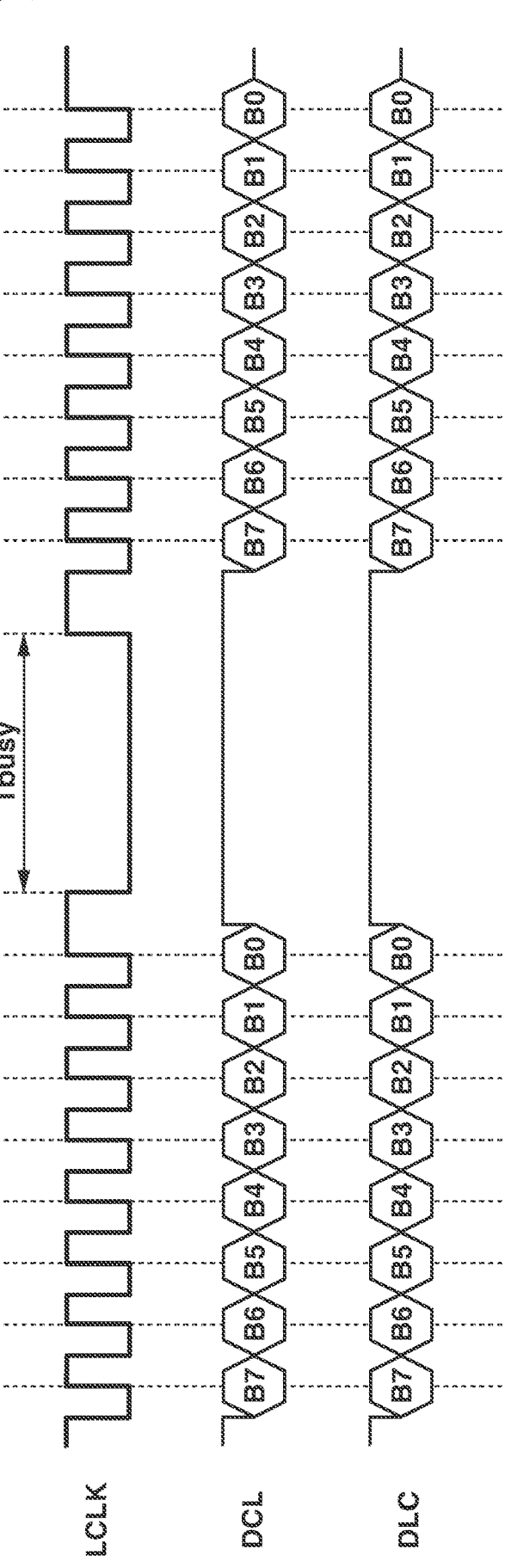
FIG. 3 illustrates an example of clock synchronization communication according to the first exemplary embodiment.

FIG. 3 illustrates an example of clock synchronization communication. FIG. 3 illustrates waveforms of a clock line LCLK and a data line DCL and a data line DLC in the clock synchronization communication between the communication units 140 and 210. The communication unit 210 outputs a clock signal to the clock line LCLK and outputs 8-bit data B7 to B0 to the data line DCL in synchronization with the rise of the clock signal. The communication unit 140 outputs 8-bit data B7 to B0 to the data line DLC in synchronization with the rise of the clock signal. The communication unit 210 receives the 8-bit data B7 to B0 on the data line DLC in synchronization with the rise of the clock signal. Likewise, the communication unit 140 receives the 8-bit data B7 to B0 on the data line DCL in synchronization with the rise of the clock signal. As described above, the communication units 210 and 140 mutually exchange communication data. When the communication unit 140 receives the 8-bit data B7 to B0 on the data line DCL, the potential of the clock line LCLK is set to a low level for a time period Tbusy. During the time period Tbusy, the lens apparatus 100 processes the receive data, and the communication unit 210 does not perform data transmission. The flow of the communication data can be controlled in this way. Repeating the foregoing processing enables data (information) to be exchanged between the communication units 210 and 140.

<Initial Communication>

FIGS. 4A, 4B, and 4C illustrate examples of information to be transmitted in the initial communication. FIG. 4A illustrates a configuration of the information to be transmitted by the imaging apparatus body 200 and the information to be transmitted by the lens apparatus 100.

These pieces of information may be the above-described 8-bit data in the clock synchronization communication. These pieces of information are communicated (transmitted) in a "Communication Order" illustrated in FIG. 4A.

The information to be transmitted by the lens apparatus 100 includes information A and B (information for identifying the lens apparatus 100). The information A (lens apparatus information A) includes lens apparatus information A1, A2, A3, and A4. The lens apparatus information A1, A2, and A3 indicates whether the driving of the diaphragm unit 114, the zoom lens unit 102, and the focus lens unit 105, respectively, by the imaging apparatus body 200 is possible. The lens apparatus information A4 indicates whether the status of the AF/MF switch 135 can be transmitted. Whether the driving of each of the units is possible indicates whether each of the units can be driven according to driving commands A and B (described below).

Information B (lens information B) includes lens apparatus information B1, B2, B3, and B4. The lens apparatus information B1 indicates information regarding conformance to the imaging apparatus body C. The lens apparatus information B2, B3, and B4 indicates whether the driving of the diaphragm unit 114, the zoom lens unit 102, and the focus lens unit 105, respectively, by the imaging apparatus body 200 is possible and whether a drive limitation is present with respect to each of the units. The information "whether drive limitation is present"" refers to whether a limitation that inhibits driving of a drive unit in parallel with driving of another drive unit when the drive unit is being driven according to a driving command is present. The information "whether driving is possible/whether drive limitation is present" indicates whether driving according to driving commands A and B (described below) is possible and whether a drive limitation is present.

Like the information transmitted by the lens apparatus 100, the information transmitted by the imaging apparatus body 200 also include information A and B as illustrated in FIG. 4B. The information A (imaging apparatus body information A) includes imaging apparatus body information A1 and A2. The imaging apparatus body information A1 indicates the level of power to be supplied to the lens apparatus 100 by the imaging apparatus body 200. The imaging apparatus body information A2 indicates information regarding conformance of the imaging apparatus body 200 to a driving command A. The information B (imaging apparatus body information B) includes imaging apparatus body information B1 that indicates information regarding conformance of the imaging apparatus body 200 to a driving command B.

FIG. 4B illustrates the values (content) of the imaging apparatus body information A and B (information for identifying the imaging apparatus body 200) corresponding to the imaging apparatus bodies A, B, and C.

The imaging apparatus body information A1 indicates a High level for the imaging apparatus body A and indicates a Low level for the imaging apparatus bodies B and C. The imaging apparatus body information A2 indicates that the imaging apparatus body A conforms to the driving command A and that the imaging apparatus bodies B and C do not conform to the driving command A. The imaging apparatus body information B1 indicates that the imaging apparatus body C conforms to the driving command B and that the imaging apparatus bodies A and B do not conform to the driving command B. The driving commands A and B are different from each other, for example, in the resolution and type of the driving command.

FIG. 4C illustrates information A and B to be transmitted in the initial communication before the lens apparatus 100 identifies the imaging apparatus body 200, and information A and B to be transmitted in relation to each of the imaging apparatus bodies A, B, and C in the communication after the lens apparatus 100 identifies the imaging apparatus body 200. In the initial communication, the lens apparatus information A is information that does not matter to the drive control on the lens apparatus 100 regardless of the type of the connected imaging apparatus body 200. For example, the lens apparatus information A indicates that the driving of each optical member is inhibited (not possible). This is intended to prevent excessive power consumption in parallel driving of a plurality of optical members in the case where the level of power supplied from the imaging apparatus body 200 is a low level. The information to be transmitted in the initial communication indicates that the AF/MF switch status information cannot be transmitted.

In the communication after the lens apparatus 100 identifies the imaging apparatus body 200, the lens apparatus information A indicates whether driving of each optical member is possible, which is determined for each of the imaging apparatus bodies A, B, and C. For the imaging apparatus body A, the lens apparatus information A indicates that driving of all of the optical members is possible and that the AF/MF switch status information can be transmitted. For the imaging apparatus body B, the lens apparatus information A indicates that driving of all of the optical members is not possible and that the AF/MF switch status information cannot be transmitted. For the imaging apparatus body C, the lens apparatus information A indicates that driving of all of the optical members is possible and that the AF/MF switch status information can be transmitted.

In the initial communication, the lens apparatus information B1 indicates that the lens apparatus does not conform to the imaging apparatus body C. In the initial communication, the lens apparatus information B2, B3, and B4 indicate that driving of each corresponding optical member is not possible. In the communication after the lens apparatus 100 identifies the imaging apparatus body 200, the lens apparatus information B1 indicates conformance to the camera C for all the types of imaging apparatus bodies 200. The lens apparatus information B2, B3, and B4 indicates whether driving of each corresponding optical member is possible for the imaging apparatus body A. The lens apparatus information B2, B3, and B4 indicates that driving of each corresponding optical member is not possible for the imaging apparatus body B. The lens apparatus information B2, B3, and B4 indicates that driving of each corresponding optical member is possible, and that a drive limitation is present for the imaging apparatus body C. The imaging apparatus body C conforms to the driving command B but the power supply level is set to a low level, so that the imaging apparatus body C cannot supply sufficient power to drive the zoom lens unit 102 and the focus lens unit 105 in parallel. Therefore, a drive limitation is present for driving of each optical member.

Figure 5:
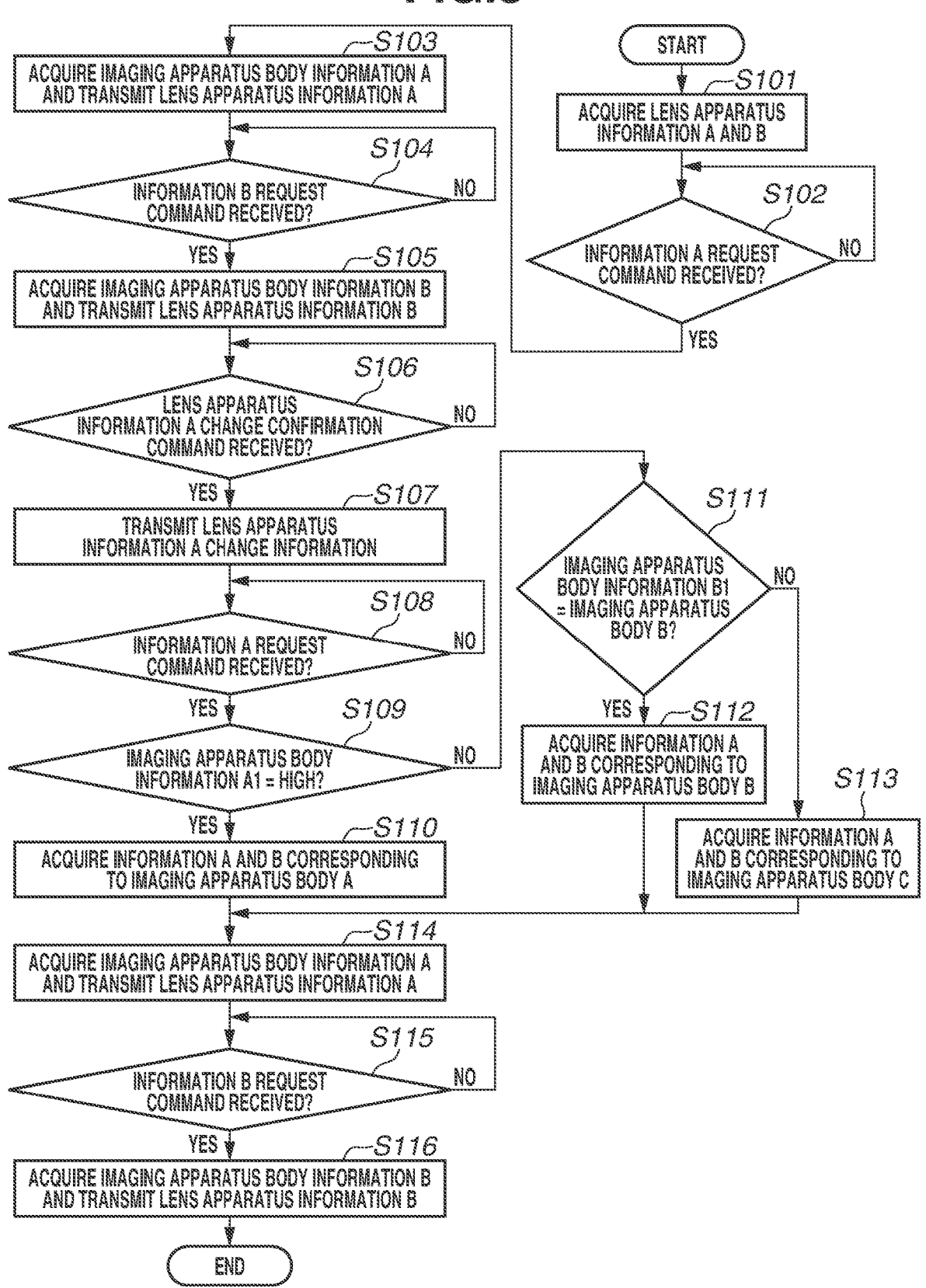
FIG. 5 is a flowchart illustrating an example of processing of the initial communication according to the first exemplary embodiment.

FIG. 5 is a flowchart illustrating an example of processing of the initial communication. This processing can be performed by the control unit 111. Referring to FIG. 5, in step S101, the control unit 111 acquires the lens apparatus information A and B from a storage unit inside or outside the control unit 111. In step S102, the control unit 111 determines whether a command requesting the information A is received from the communication unit 210. In a case where the command is received (YES in step S102), the processing proceeds to step S103. In step S103, the control unit 111 acquires the imaging apparatus body information A and transmits the lens apparatus information A to the communication unit 210. In step S104, the control unit 111 determines whether a command requesting the information B is received from the communication unit 210. In a case where the command is received (YES in step S104), the processing proceeds to step S105. In step S105, the control unit 111 acquires the imaging apparatus body information B and transmits the lens apparatus information B to the communication unit 210. In step S106, the control unit 111 determines whether a command to confirm whether the lens apparatus information A is changed is received from the communication unit 210. In a case where the command is received (YES in step S106), the processing proceeds to step S107. In step S107, the control unit 111 transmits information indicating that the lens apparatus information A has been changed to the communication unit 210. Upon reception of the information indicating that the lens apparatus information A has been changed, the communication unit 210 transmits a command requesting the information A and a command requesting the information B to the communication unit 140. In step S107, instead of transmitting the information indicating that the lens apparatus information A has been changed, the control unit 111 may transmit a response that is not consistent with or appropriate as a response to the information (request) transmitted from the imaging apparatus body 200 or may transmit no response. More specifically, the processing in step S107 can be processing to promote the imaging apparatus body 200 to retransmit first information, which includes performing no processing.

In step S108, the control unit 111 determines whether the command requesting the information A is received from the communication unit 210. In a case where the command is received (YES in step S108), the processing proceeds to step S109. In step S109, the control unit 111 determines whether the imaging apparatus body information A1 received in step S103 indicates "High". In a case where the information A1 indicates "High" (YES in step S109), the processing proceeds to step S110. On the other hand, in a case where the information A1 indicates "Low" (NO in step S109), the processing proceeds to step S111. In step S110, the control unit 111 acquires the information A and B corresponding to the imaging apparatus body A. In step S111, the control unit 111 determines whether the imaging apparatus body information B1 received in step S105 indicates the imaging apparatus body B. In a case where the information B1 indicates the imaging apparatus body B (YES in step S111), the processing proceeds to step S112. On the other hand, in a case where the information B1 indicates the imaging apparatus body C (NO in step S111), the processing proceeds to step S113. In step S112, the control unit 111 acquires the information A and B corresponding to the imaging apparatus body B. In step S113, the control unit 111 acquires the information A and B corresponding to the imaging apparatus body C.

In step S114, the control unit 111 acquires the imaging apparatus body information A and transmits the lens apparatus information A corresponding to the information A to the communication unit 210. The lens apparatus information A is acquired in one of steps S110, S112, and S113. In step S115, the control unit 111 determines whether the command requesting the information B is received from the communication unit 210. In a case where the command is received (YES in step S115), the processing proceeds to step S116. In step S116, the control unit 111 acquires the imaging apparatus body information B and transmits the lens apparatus information B corresponding to the information B to the communication unit 210. As described above, the lens apparatus body information A and B corresponding to the imaging apparatus bodies A, B, and C can be transmitted to the communication unit 210 based on the imaging apparatus body information A and B.

The lens apparatus 100 and the imaging apparatus body 200 conforming to the driving command B have been described above. The lens apparatus 100 and the imaging apparatus body 200 conforming only to the driving command A also exist. In the case of the lens apparatus 100 conforming only to the driving command A, in step S103 in the flowchart in FIG. 5, the control unit 111 identifies the imaging apparatus bodies A and B based on the imaging apparatus body information A and acquires the lens apparatus information. Since the imaging apparatus body 200 does not transmit the command requesting the information B, the control unit 111 does not perform the processing in step 104 and subsequent steps, and the processing is ended.

In the above-described processing, in a case where the imaging apparatus body 200 is the imaging apparatus body A, the lens apparatus information corresponding to the imaging apparatus body A is transmitted to the communication unit 210. In a case where the imaging apparatus body 200 is the imaging apparatus body B or C, the lens apparatus information corresponding to the imaging apparatus body B or C is transmitted to the communication unit 210. Processing performed in a case where the imaging apparatus body 200 conforms only to the driving command A is similar to the processing performed in a case where the lens apparatus 100 conforms only to the driving command A.

<Effects of Present Exemplary Embodiment>

According to the present exemplary embodiment, even in a case where the lens apparatus 100 determines that the imaging apparatus body 200 is the imaging apparatus body C after the transmission of the lens apparatus information A, the lens apparatus information A that has already been transmitted can be updated. This enables a permission to drive the optical members based on the driving command B to be given to the imaging apparatus body C. In addition, by the transmission of the lens apparatus information B, information about a drive limitation for each optical member can be transmitted to the imaging apparatus body 200. This enables the imaging apparatus body 200 as the imaging apparatus body C to issue a driving command for each optical member under the drive limitation. In a case where the parallel driving of a plurality of optical members is not possible because of a limitation on the power supply, the control unit 111 may transmit information about a drive limitation to the control unit 207 in the communication following the initial communication. This processing also make it possible to achieve the above-described effects. Although the focus lens unit 105 has a drive limitation in the above-described example, the configuration is not limited thereto. A drive limitation can be set on other optical members. Even in a case where function expansion is performed for the imaging apparatus as described above, the compatibility with the conventional apparatus and the expanded function of the imaging apparatus can be implemented in accordance with the combination of the lens apparatus 100 and the imaging apparatus body 200.

<Drive Modes>

Processing performed by the control unit 111 (power control unit 142) to determine a drive mode based on the configuration of the imaging apparatus will be described below. The drive modes can include four different modes: all drive mode, partial drive mode, all drive inhibited mode, and power saving mode. In the all drive mode, the imaging apparatus body 200 supplies sufficient power to the lens apparatus 100, or an external power source is connected to the lens apparatus 100, enabling all of the optical members to be driven in parallel. In the partial drive modes, the imaging apparatus body 200 cannot supply sufficient power to drive all of the optical members in parallel, and no driving command is issued from the imaging apparatus body 200. In the partial drive mode, some of the optical members are driven such that the power consumption does not exceed a predetermined amount of power supply. In this case, the driving of the focus lens unit 105 is inhibited and the parallel driving (partial driving) of the other optical members is enabled. The optical member to be inhibited from driving is not limited to the focus lens unit 105. In the power saving mode, the imaging apparatus body 200 cannot supply sufficient power to drive all of the optical members in parallel, and a driving command is issued from the imaging apparatus body 200. In the power saving mode, a drive control is performed to selectively drive the optical members such that the power consumption does not exceed the predetermined amount of power supply. The power saving mode will be described below.

Figure 6:
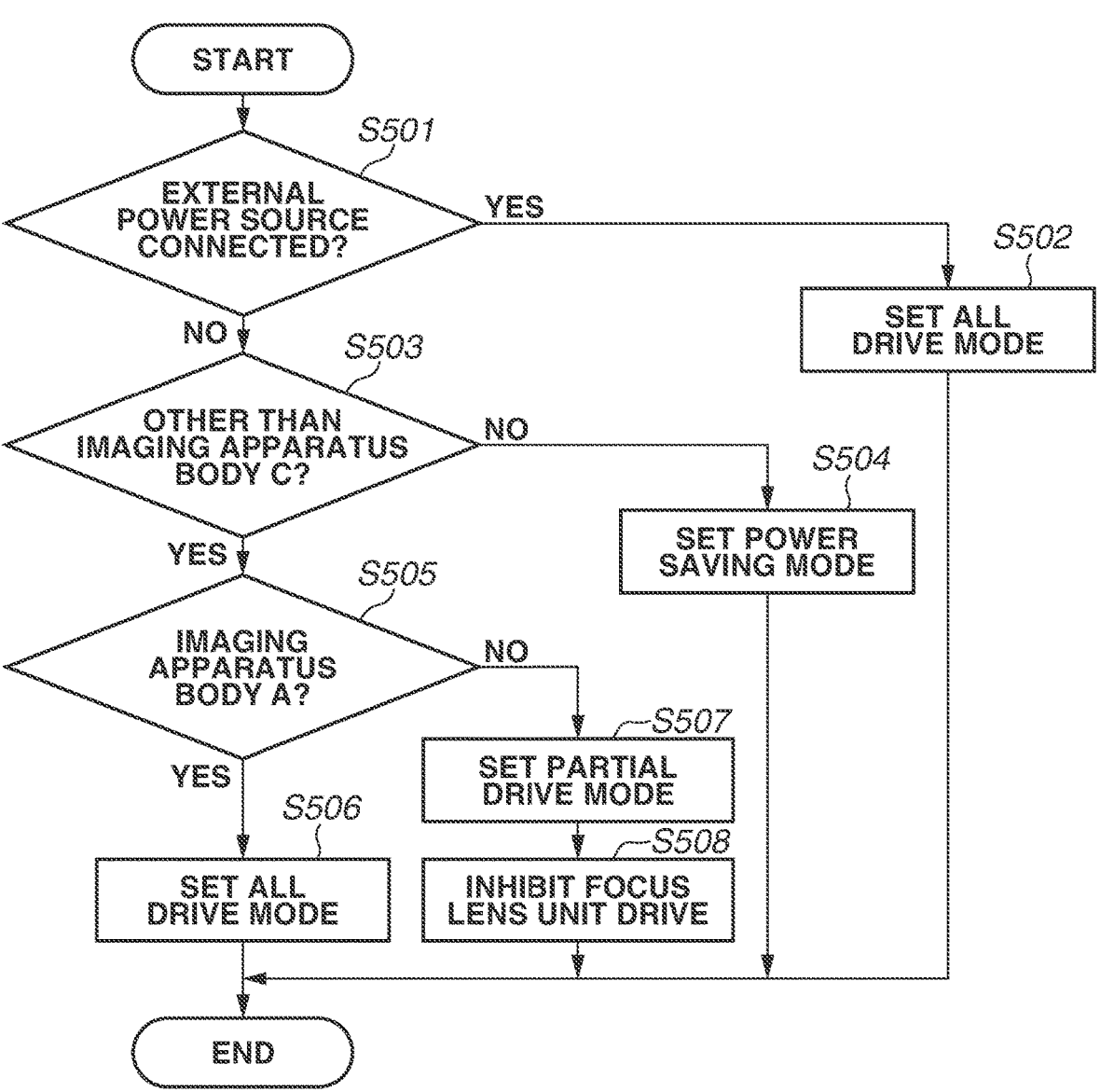
FIG. 6 is a flowchart illustrating an example of processing of drive mode selection according to the first exemplary embodiment.

FIG. 6 is a flowchart illustrating an example of processing of drive mode selection. In this case, the initial drive mode is set to the partial drive mode. Referring to FIG. 6, in step S501, it is determined whether the external power source 30 is connected to the lens apparatus 100. In a case where it is determined that the external power source 30 is connected to the lens apparatus 100 (YES in step S501), the processing proceeds to step S502. On the other hand, in a case where it is determined that the external power source 30 is not connected to the lens apparatus 100 (NO in step S501), the processing proceeds to step S503. In step S502, the all drive mode is set as a drive mode. Then, the processing is ended. In step S503, it is determined whether the imaging apparatus body 200 connected with the lens apparatus 100 is other than the imaging apparatus body C. In a case where it is determined that the imaging apparatus body 200 is other than the imaging apparatus body, i.e., the imaging apparatus body A or B (YES in step S503), the processing proceeds to step S505. On the other hand, in a case where it is determined that the imaging apparatus body 200 is the imaging apparatus body C (NO in step S503), the processing proceeds to step S504. In step S504, the power saving mode is set as a drive mode. In step S505, it is determined whether the imaging apparatus body 200 connected with the lens apparatus 100 is the imaging apparatus body A. In a case where it is determined that the imaging apparatus body 200 is the imaging apparatus body A (YES in step S505), the processing proceeds to step S506. On the other hand, in a case where it is determined that the imaging apparatus body 200 is not the imaging apparatus body A (NO in step S505), the processing proceeds to step S507. In step S506, the all drive mode is set as a drive mode. Then, the processing is ended. In step S507, the partial drive mode is set as a drive mode. In step S508, the driving of the focus lens unit 105 is inhibited. Then, the processing is ended. In the manner described above, the drive mode is set by the power control unit 142.

Processing performed by the control unit 111 in the partial drive mode will be described below. In the partial drive mode, the driving of the focus lens unit 105 is inhibited. Thus, for example, even upon reception of a driving command from the focus controller 10, the control unit 111 ignores the driving command and does not generate a driving command for the drive control unit 141. Upon reception of a driving command for an optical member other than the focus lens unit 105, the control unit 111 generates a driving command for the drive unit corresponding to the optical member. In the manner described above, a part of the optical members is driven in the partial drive mode.

Figure 7:
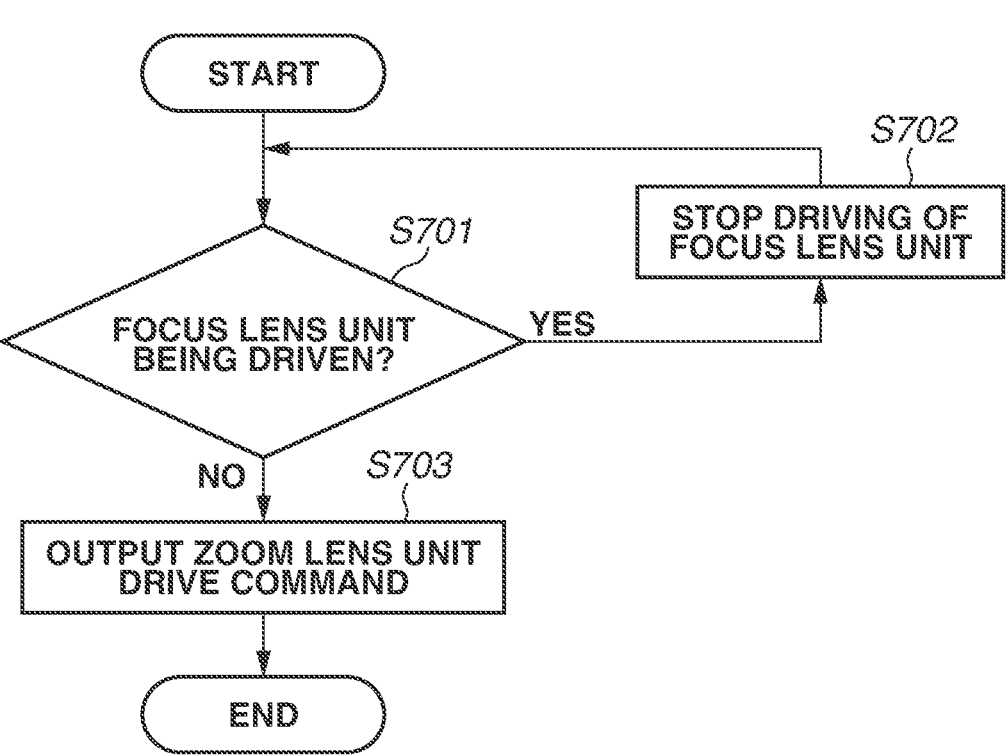
FIG. 7 is a flowchart illustrating an example of zoom driving processing in a power saving mode according to the first exemplary embodiment.

Processing performed by the control unit 111 in the power saving mode will be described below. FIG. 7 is a flowchart illustrating an example of zoom driving processing in the power saving mode. In this example, the driving of the zoom lens unit 102 is given a higher priority than the driving of the focus lens unit 105. By performing control such that the zoom lens unit 102 and the focus lens unit 105 are not driven in parallel, the power consumption is controlled not to exceed the predetermined amount of power supply. The processing in FIG. 7 is started when the driving command for the zoom lens unit 102 is input to the control unit 111. In step S701, the control unit 111 determines whether the focus lens unit 105 is currently being driven. In a case where the focus lens unit 105 is currently being driven (YES in step S701), the processing proceeds to step S702. On the other hand, in a case where the focus lens unit 105 is not currently being driven (NO in step S701), the processing proceeds to step S703. In step S702, the control unit 111 stops the driving of the focus lens unit 105. Then, the processing returns to step S701. In step S703, the control unit 111 outputs the driving command for the zoom lens unit 102 to the drive unit 108. Then, the processing is ended.

Figure 8:
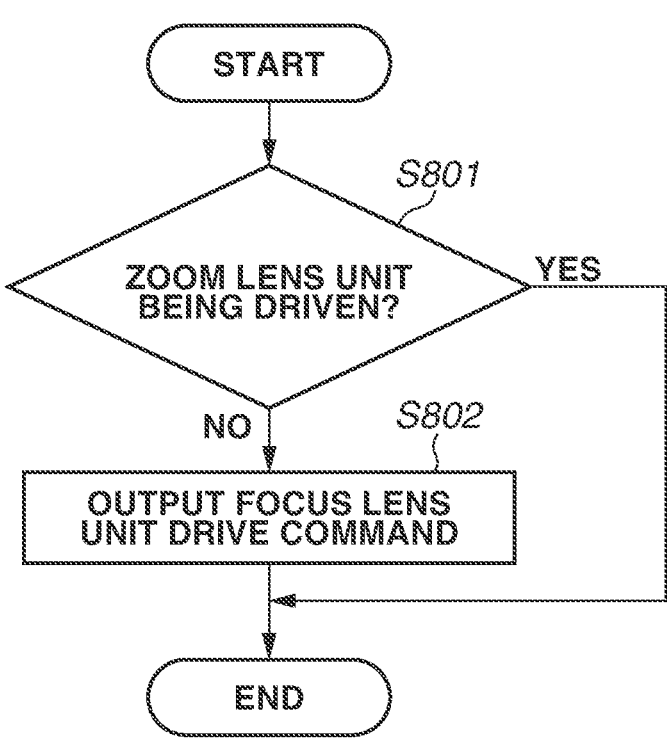
FIG. 8 is a flowchart illustrating an example of focus driving processing in the power saving mode according to the first exemplary embodiment.

FIG. 8 is a flowchart illustrating an example of focus driving processing in the power saving mode. The processing in FIG. 8 is started when the driving command for the focus lens unit 105 is input to the control unit 111. In step S801, the control unit 111 determines whether the zoom lens unit 102 is currently being driven. In a case where the zoom lens unit 102 is currently being driven (YES in step S801), the control unit 111 discards the driving command for the focus lens unit 105. Then, the processing is ended. As a result, the focus lens unit 105 is not driven. On the other hand, in a case where the zoom lens unit 102 is not currently being driven (NO in step S801), the processing proceeds to step S802. In step S802, the control unit 111 outputs the driving command for the focus lens unit 105 to the drive unit 109. Then, the processing is ended. The control unit 111 exclusively performs the driving of the zoom lens unit 102 and the driving of the focus lens unit 105 in this way while giving priority to the driving of the zoom lens unit 102, thereby being able to prevent the power consumption from exceeding the predetermined amount of power supply.

FIGS. 9A and 9B illustrate examples of driving of the optical members for each type of the imaging apparatus body 200. FIG. 9A illustrates the driving of the optical members in the lens apparatus 100 in response to a driving command from the communication unit 210. FIG. 9A illustrates an example of driving of each optical member when the lens apparatus 100 conforming to the driving command B is connected to the imaging apparatus bodies A, B, and C. The symbol "○" indicates that the driving is possible, the symbol "x" indicates that the driving is not possible, and the symbol "Δ" indicates that the driving is possible in the power saving mode. In this case, the external power source 30 is assumed to be not connected to the lens apparatus 100. In a case of the imaging apparatus body A, the lens apparatus 100 is supplied with sufficient power, so that the lens apparatus 100 operates in the all drive mode. In FIG. 9A, "Iris" denotes the diaphragm unit 114, "Zoom" denotes the zoom lens unit 102, "Focus" denotes the focus lens unit 105, and "IsShift" denotes the image stabilizing lens unit 103, and "IsMloc" denotes the lock mechanism 104. The imaging apparatus body A does not receive a driving command for the image stabilizing lens unit 103 and the lock mechanism 104 from the imaging apparatus body 200.

In a case of the imaging apparatus body B, the lens apparatus 100 is supplied with no power from the external power source 30, so that the lens apparatus 100 operates in the partial drive mode. None of the optical members conform to a driving command from the imaging apparatus body B, and hence no optical members are driven by a driving command from the communication unit 210.

In a case of the imaging apparatus body C, the lens apparatus 100 is supplied with no power from the external power source 30, the lens apparatus 100 operates in the power saving mode. The diaphragm unit 114 is thus driven based on a driving command from the communication unit 210. The image stabilizing lens unit 103 and the lock mechanism 104 do not receive a driving command from the imaging apparatus body C. Since the imaging apparatus body C does not supply sufficient power to drive the zoom lens unit 102 and the focus lens unit 105 in parallel, the lens apparatus 100 performs the exclusive driving while giving priority to the zoom lens unit 102 (in the power saving mode). Operations of the image stabilizing lens unit 103 and the lock mechanism 104 will be described in detail below.

FIG. 9B illustrates the driving of the optical members in the lens apparatus 100 in response to driving commands from other than the communication unit 210. The driving commands from other than the communication unit 210 include a driving command generated for the zoom lens unit 102 based on the operation of the zoom switch 133 or the zoom controller 20. the driving commands also include a driving command generated for the focus lens unit 105 based on the operation of focus controller 10, a driving command generated for the image stabilizing lens unit 103 and the lock mechanism 104 based on the operation of the image stabilizing switch 132, and a driving command for the diaphragm unit 114 based on the operation ring 130 in a case where the operation ring 130 is set for operating the diaphragm unit 114.

Since the imaging apparatus body A supplies sufficient power to the lens apparatus 100, the lens apparatus 100 operates in the all drive mode. Since the imaging apparatus body B does not supply sufficient power to drive all of the optical members in parallel, the lens apparatus 100 operates in the partial drive mode where the driving of the focus lens unit 105 is inhibited. In a case of the imaging apparatus body C, the lens apparatus 100 drives the diaphragm unit 114. Since the imaging apparatus body C does not supply sufficient power to drive the zoom lens unit 102 and the focus lens unit 105 in parallel, the lens apparatus 100 performs the exclusive driving while giving priority to the zoom lens unit 102 (in the power saving mode). The lens apparatus 100 drives the image stabilizing lens unit 103 (i.e., the driving of the image stabilizing lens unit 103 is switched ON or OFF) based on the operation of the image stabilizing switch 132. The lens apparatus 100 drives the lock mechanism 104 at the timing when the power source is switched ON or OFF.

Performing this operation enables reducing the number of times of driving the lock mechanism 104 to reduce the power consumption. The lock mechanism 104 will be described in detail below.

<Controlling Image Stabilizing Lens Unit and Lock Mechanism>

FIGS. 10A and 10B illustrate examples of state transitions of the image stabilizing lens unit 103 and the lock mechanism 104.

FIG. 10A illustrates the operations of the image stabilizing lens unit 103 and the lock mechanism 104 in the all drive mode. The top row of the table represents the states of the imaging apparatus, i.e., the state of the imaging apparatus body 200 where the power source of the imaging apparatus body 200 is turned ON, the state of the imaging apparatus body 200 where the image stabilizing switch 132 is turned ON, the state of the imaging apparatus body 200 where the image stabilizing switch 132 is turned OFF, and the state of the imaging apparatus body 200 where the power source of the imaging apparatus body 200 is turned OFF, in the order from left to right. The middle row of the table represents the states of the image stabilizing lens unit 103. The bottom row of the table represents the states of the lock mechanism 104. The image stabilizing lens unit 103 enters the image stabilizing state when the image stabilizing switch 132 is turned ON ("IS ON"), and enters the non-image stabilizing state (i.e., the image stabilizing lens unit 103 is held at the initial position) when the image stabilizing switch 132 is turned OFF ("IS OFF"). When the power source of the imaging apparatus body 200 is turned ON, the lock mechanism 104 follows the state of the image stabilizing switch 132. The lock mechanism 104 enters an unlocked state when the image stabilizing switch 132 is turned ON, and enters a locked state when the image stabilizing switch 132 is turned OFF. When the power source of the imaging apparatus body 200 is turned OFF, the lock mechanism 104 enters the locked state. The lock mechanism 104 is switched between the locked and the unlocked states by operation of a drive unit (actuator). The operations of the image stabilizing lens unit 103 and the lock mechanism 104 in the partial drive mode are similar to those illustrated in the all drive mode.

FIG. 10B illustrates the operations of the image stabilizing lens unit 103 and the lock mechanism 104 in the power saving mode. The image stabilizing lens unit 103 operates in a similar manner to that in the all drive mode. When the power source of the imaging apparatus body 200 is turned ON, the lock mechanism 104 enters the unlocked state regardless of the state of the image stabilizing switch 132. When the power source of the imaging apparatus body 200 is turned OFF, the lock mechanism 104 enters the locked state. The above-described control enables reduction in the number of lock operations, thereby reducing the power consumption or increasing power to be distributed to drive other optical members.

With the above-described configuration, the present exemplary embodiment enables providing a lens apparatus, an imaging apparatus body, an imaging apparatus, and a program which are beneficial in implementing the compatibility with the conventional apparatus (model) and an expanded function of the imaging apparatus. In the power saving mode, the driving speeds of the optical members may be reduced in lieu of or in addition to the exclusive drive control for the plurality of optical members. In the above-described example, information transmitted from the lens apparatus 100 to the imaging apparatus body 200 is updated based on the configuration of the imaging apparatus. However, information transmitted from the imaging apparatus body 200 to the lens apparatus 100 may be updated based on the configuration.

Figure 11:
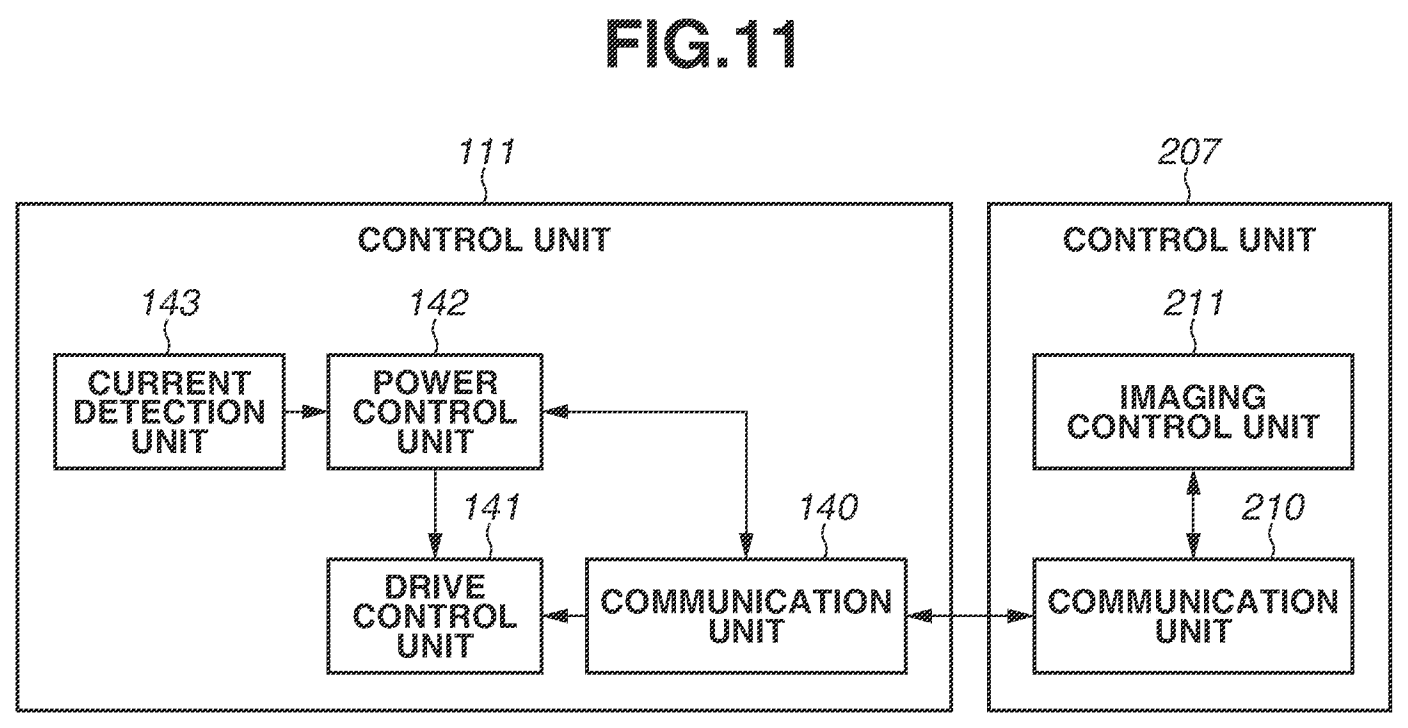
Figure 12:
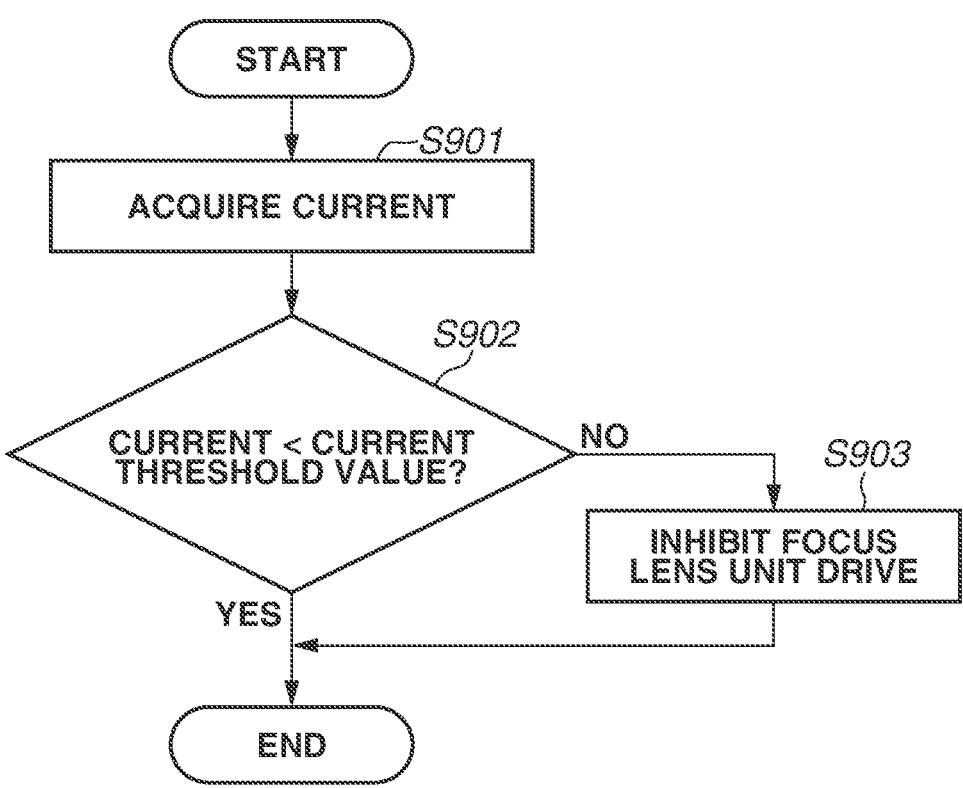
FIG. 12 is a flowchart illustrating an example of processing of power control according to the second exemplary embodiment.

A second exemplary embodiment will be described below centering on an example where a drive limitation is set on the optical members in accordance with the power consumption of the drive units. FIG. 11 illustrates examples of configurations of the control unit 111 in the lens apparatus 100 and the control unit 207 in the imaging apparatus body 200 according to the second exemplary embodiment. Referring to FIG. 11, the control unit 111 further includes a current detection unit 143. The current detection unit 143 detects a current (drive current) in each of the drive circuits 119, 120, 121, 124, and 125 and outputs the current information to the power control unit 142. FIG. 12 is a flowchart illustrating an example of processing of power control. A current threshold value (described below) is a threshold value related to the current set based on power supplied from the power source unit 208. The current threshold value can be stored in the control unit 111. Referring to FIG. 12, in step S901, the current detected by the current detection unit 143 is acquired. In step S902, it is determined whether the current acquired in step S901 is smaller than the current threshold value. In a case where it is determined that the current is smaller than the current threshold value (YES in step S902), the processing is ended. On the other hand, in a case where it is determined that the current is not smaller than the current threshold value, i.e., equal to or greater than the current threshold value (NO in step S902), the processing proceeds to step S903. In step S903, the driving of the focus lens unit 105 is inhibited. Then, the processing is ended. This processing is repetitively performed.

In a case where the drive current exceeds the current threshold value, the above-described configuration inhibits the driving of the focus lens unit 105, thereby preventing the power consumption from exceeding predetermined power. The optical member to be inhibited from driving is not limited to the focus lens unit 105 but may be another optical member. The driving speed of the optical member may be reduced in lieu of or in addition to the inhibition of the driving of the optical member. Another physical quantity related to the power consumption may be detected in lieu of or in addition to the drive current detection.

Figure 13:
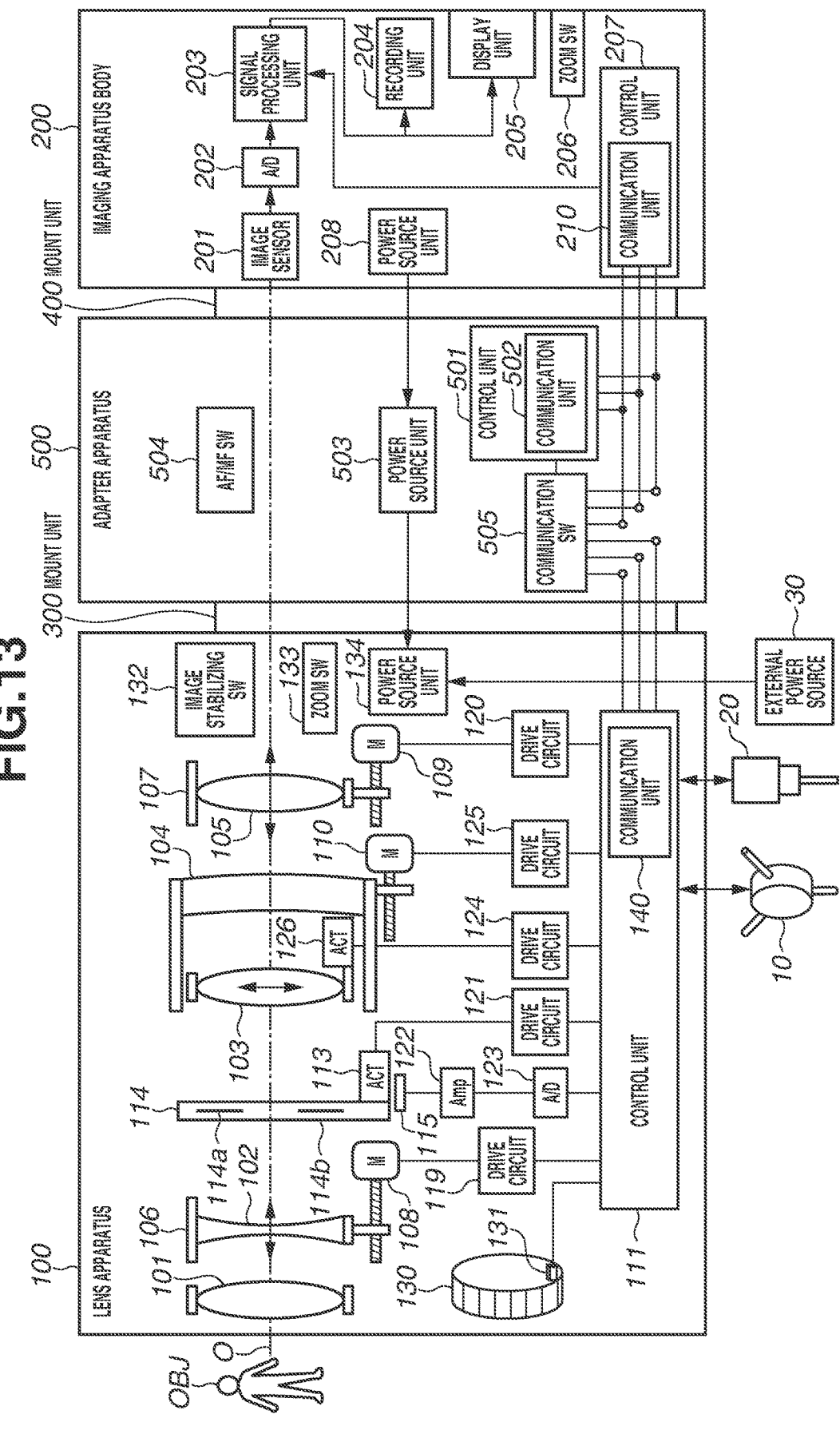
FIG. 13 illustrates an example of a configuration of an imaging apparatus according to a third exemplary embodiment.

A third exemplary embodiment will be described below centering on an example of a configuration of an imaging apparatus including an (intermediate) adapter apparatus as a lens apparatus attached between an interchangeable lens apparatus and an imaging apparatus body. FIG. 13 illustrates an example of a configuration of the imaging apparatus according to the third exemplary embodiment. An adapter apparatus 500 can include an optical member disposed on the optical path between the interchangeable lens apparatus 100 and the imaging apparatus body 200. For example, the adapter apparatus 500 may be an extension tube for changing the back focus length or an extender for changing the imaging magnification. The adapter apparatus 500 includes a control unit 501 (adapter microcomputer), a communication unit 502, a power source unit 503, an AF/MF switch 504, and a communication switch 505. The control unit 501 controls the operation of each unit in the adapter apparatus 500. The AF/MF switch 504 is used to switch between the AF state and the MF state. In the AF state, the focus lens unit 105 is driven based on a driving command from the imaging apparatus body 200. In the MF state, the focus lens unit 105 is operated by the operation ring 130 and the (remote) focus controller 10 (e.g., a focus demand) provided on the lens apparatus 100. The status of the communication switch 505 is detected by the control unit 501, and the status information is transmitted to the imaging apparatus body 200 via the communication unit 502. The imaging apparatus body 200 determines whether the focus lens unit 105 can be driven from the imaging apparatus body 200, based on the status information. The status information is also transmitted to the lens apparatus 100 via the communication unit 502 or 210. According to the third exemplary embodiment, the adapter apparatus 500 is provided with the AF/MF switch 504 having a similar function to that of the AF/MF switch 135 according to the first exemplary embodiment. The AF/MF switch 504 may be provided on the lens apparatus 100 and the imaging apparatus body 200.

Information indicating that the adapter apparatus 500 is provided with the communication switch 505 is transmitted from the communication unit 502 to the communication unit 210. Information about the status of the communication switch 505 is transmitted from the communication unit 502 to the communication unit 210. The imaging apparatus body 200 can thus detect that the lens apparatus 100 and the adapter apparatus 500 are provided with an AF/MF switch. In a case where both of the lens apparatus 100 and the intermediate adapter apparatus 500 are provided with an AF/MF switch, the operation of the AF/MF switch provided on the lens apparatus 100 is given priority. When the imaging apparatus is activated, communication between the communication units 140 and 210 can be performed by shorting out (closing) the communication line between the communication units 140 and 502 by use of the communication switch 505. In a case where communication is to be performed between the communication units 502 and 210, the communication switch 505 can be opened.

<Power Supply and Communication>

The lens apparatus 100 and the adapter apparatus 500 are mechanically and electrically connected with each other via the mount unit 300. The adapter apparatus 500 and the imaging apparatus body 200 are mechanically and electrically connected via a mount unit 400. The adapter apparatus 500 is supplied with power from the power source unit 208 via a power terminal provided on the mount unit 400. The lens apparatus 100, the imaging apparatus body 200, and the adapter apparatus 500 communicate with each other via communication terminals provided on the mount units 300 and 400. The control unit 501 receives commands and information transmitted from the communication unit 210, via the communication unit 502. The control unit 501 can also receive information communicated between the communication units 140 and 210. The control unit 501 controls each unit in the adapter apparatus 500 based on a received command.

Figure 14:
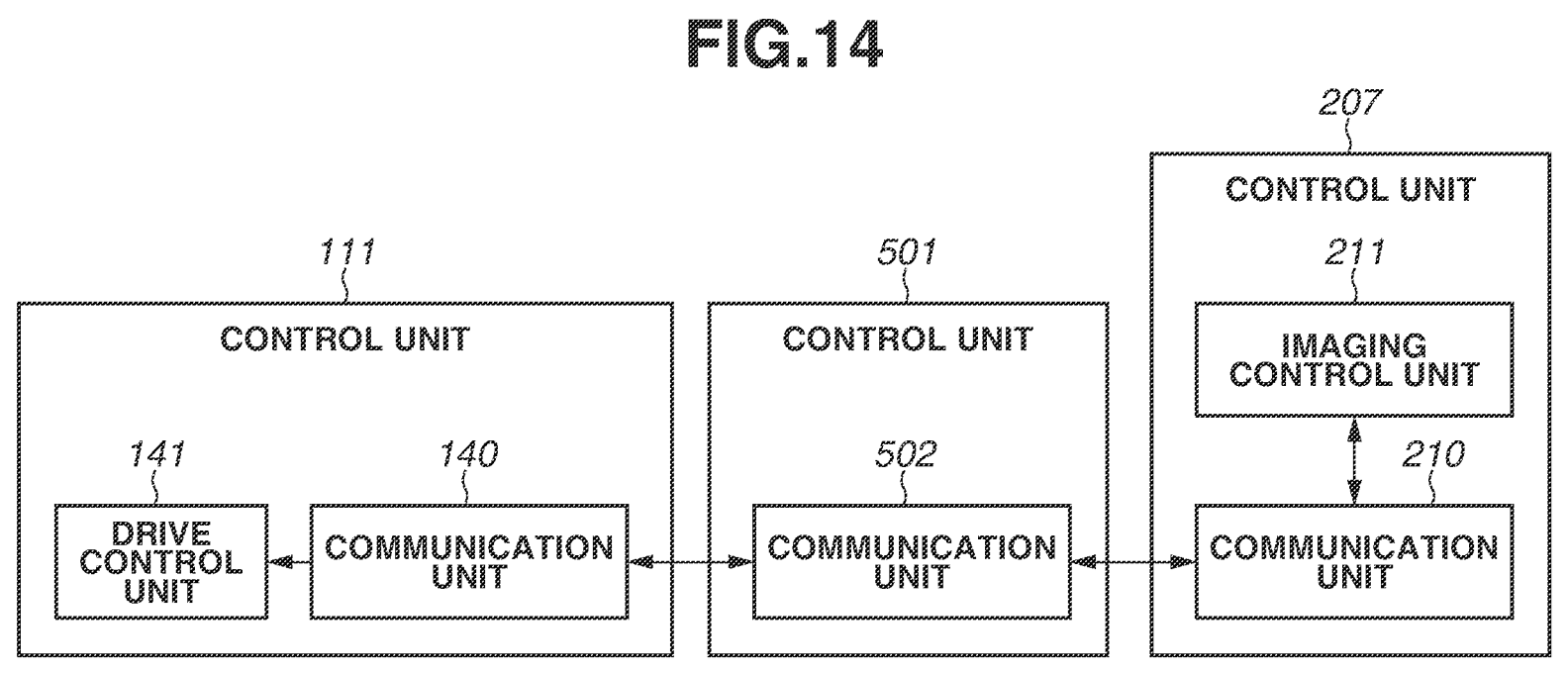

FIG. 14 illustrates examples of configurations of the control unit 111 in the lens apparatus 100, the control unit 501 in the adapter apparatus 500, and the control unit 207 in the imaging apparatus body 200. The control unit 111 includes the communication unit 140 and the drive control unit 141. The control unit 501 includes the communication unit 502. The communication unit 502 stores information communicated between the communication units 140 and 210 in the initial communication. In a case where the adapter apparatus 500 is to change information transmitted from the communication unit 140, the communication unit 502 changes the information and then transmits the changed information to the communication unit 210. The processing of changing of the information by the communication unit 502 will be described below. The configuration of the control unit 207 is similar to that according to the first exemplary embodiment.

FIGS. 15A, 15B, and 15C illustrate examples of information to be transmitted in the initial communication. According to the present exemplary embodiment, since the lens apparatus 100 is not provided with an AF/MF switch, information A4 in FIG. 15C indicates "Not Possible" for all types of imaging apparatus bodies in the initial communication and subsequent communications.

Figure 16:
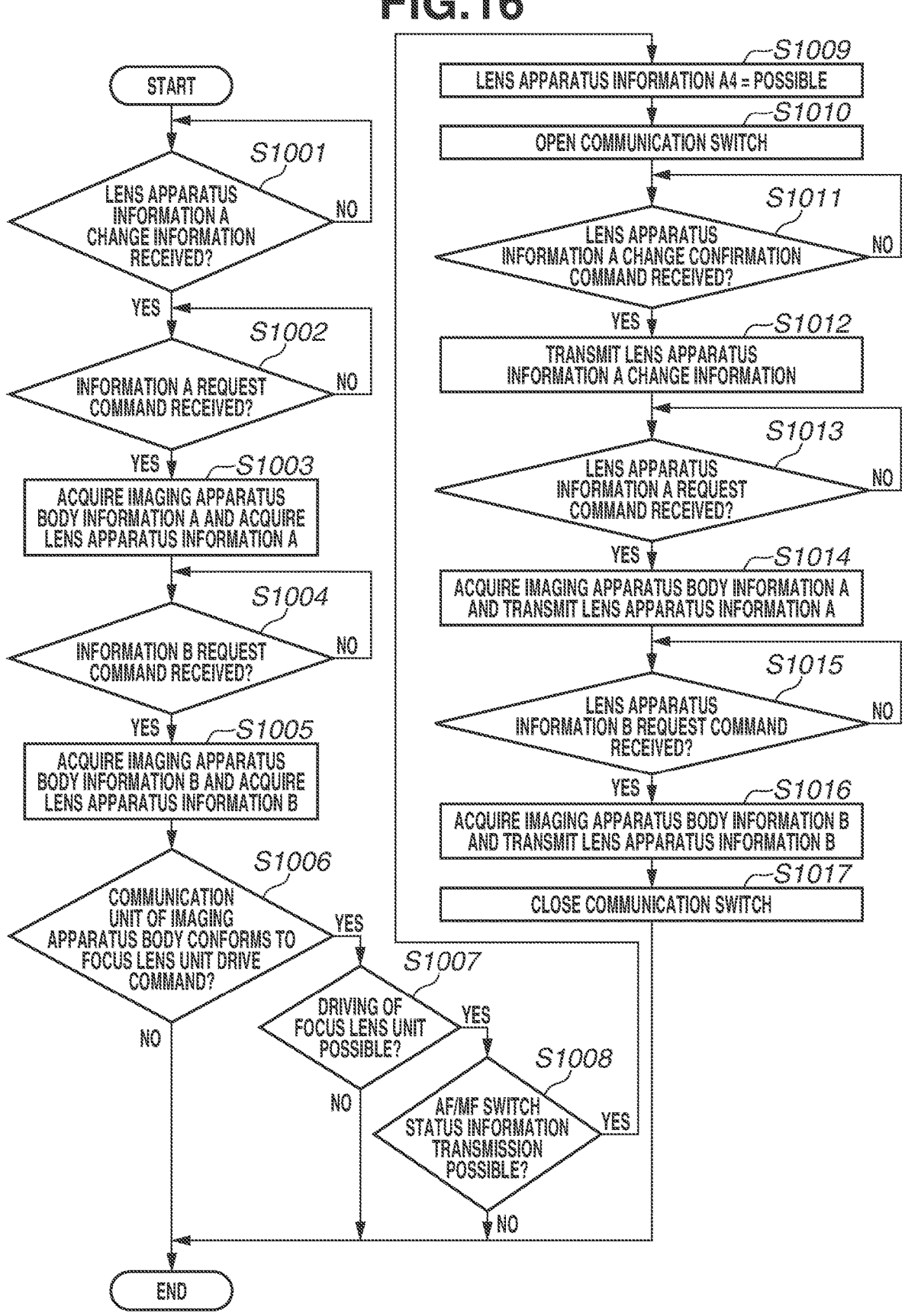
FIG. 16 is a flowchart illustrating an example of processing of initial communication according to the third exemplary embodiment.

FIG. 16 is a flowchart illustrating an example of processing of the initial communication. When the communication unit 140 performs the initial communication again to change the lens apparatus information A and B as in the first exemplary embodiment, the communication unit 140 does not subsequently perform the initial communication again to further change the lens apparatus information A and B. The processing in the flowchart illustrated in FIG. 16 is started in a state where the communication line is shorted out by the communication switch 505 and communication is performed between the communication units 140 and 210. Referring to FIG. 16, in step S1001, it is determined whether information indicating that the lens apparatus information A is changed is received from the communication unit 140 by the communication unit 502. In a case where the information is received (YES in step S1001), the processing proceeds to step S1002. In step S1002, it is determined whether a command requesting the information A from the communication unit 210 is received. When the command is received (YES in step S1002), the processing proceeds to step S1003. In step S1003, the imaging apparatus body information A transmitted from the communication unit 210 is acquired, and the lens apparatus information A transmitted from the communication unit 140 is acquired. Then, the processing proceeds to step S1004.

In step S1004, it is determined whether a command requesting the information B from the communication unit 210 is received. When the command is received (YES in step S1004), the processing proceeds to step S1005. In step S1005, the imaging apparatus body information B transmitted from the communication unit 210 is acquired, and the lens apparatus information B transmitted from the communication unit 140 is acquired. Then, the processing proceeds to step S1006. In step S1006, it is determined whether the communication unit 210 conforms to a driving command for the focus lens unit 105 based on the acquired imaging apparatus body information. In a case where the communication unit 210 conforms to the driving command (YES in step S1006), the processing proceeds to step S1007. On the other hand, in a case where the communication unit 210 does not conform to the driving command (NO in step S1006), the processing is ended. The determination regarding whether the communication unit 210 conforms to the driving command is made based on the determination regarding whether either the imaging apparatus body information A2 or B1 indicates "Conformed".

In step S1007, the control unit 501 determines whether the driving of the focus lens unit 105 is possible based on the acquired lens apparatus information. In a case where the driving of the focus lens unit 105 is possible (YES in step S1007), the processing proceeds to step S1008. On the other hand, in a case where the driving of the focus lens unit 105 is not possible (NO in step S1007), the processing is ended here. The determination regarding whether the driving of the focus lens unit 105 is possible is made based on the lens apparatus information A3. In step S1008, it is determined whether the AF/MF switch status information can be transmitted. In a case where the information can be transmitted (YES in step S1008), the processing proceeds to step S1009. On the other hand, in a case where the information cannot be transmitted (NO in step S1008), the processing is ended here. Here, the determination regarding whether the AF/MF switch status information can be transmitted is made based on the determination regarding whether a driving command for the focus lens unit 105 from the communication unit 210 is conformed and whether the lens apparatus 100 is provided with the AF/MF switch 135. Therefore, in a case where whereas a driving command for the focus lens unit 105 from the communication unit 210 is possible but the AF/MF switch status information cannot be transmitted, the lens apparatus 100 is not provided with the AF/MF switch 135. In step S1009, the control unit 501 determines that the lens apparatus information A4 indicates "Possible". Then, the processing proceeds to step S1010. In step S1010, the communication switch 505 is opened. Then, the processing proceeds to step S1011. When the communication switch 505 is opened, the communication units 502 and 210 become ready to communicate with each other, but the communication units 140 and 210 are unable to communicate with each other.

In step S1011, it is determined whether a command for confirming whether the lens apparatus information A is to be changed is received from the communication unit 210. In a case where the command is received (YES in step S1011), the processing proceeds to step S1012. On the other hand, in a case where the command is not received (NO in step S1011), the processing returns to step S1011. The communication unit 210 periodically or repeatedly transmits the command. In step S1012, information indicating that the lens apparatus information A is to be changed is transmitted to the communication unit 210. Then, the processing proceeds to step S1013. In step S1013, it is determined whether command requesting the lens apparatus information A is received from the communication unit 210. In a case where the command is received (YES in step S1013), the processing proceeds to step S1014. In step S1014, the imaging apparatus body information A from the communication unit 210 is acquired, and the lens apparatus information A is transmitted to the communication unit 210. Then, the processing proceeds to step S1015. In step S1015, it is determined whether a command requesting lens apparatus information B is received from the communication unit 210. In a case where the command is received (YES in step S1015), the processing proceeds to step S1016. In step S1016, the imaging apparatus body information B from the communication unit 210 is acquired, and the lens apparatus information B is transmitted to the communication unit 210. Then, the processing proceeds to step S1017. In step S1017, the communication switch 505 is closed. Then, processing is ended. When the communication switch 505 is closed, the communication units 140 and 210 become ready to communicate with each other.

As described above, after the initial communication between the communication units 502 and 210 is performed, the lens apparatus information changed upon attachment of the adapter apparatus 500 thereto can be communicated between the communication units 502 and 210. Thus, even in a case where the adapter apparatus 500 is attached, the imaging apparatus body 200 can control (driving of) the lens apparatus 100 and the adapter apparatus 500 based on the lens apparatus information corresponding to the case. The interchangeable lens apparatus information may be changed by the adapter apparatus 500. In addition, the adapter apparatus 500 may be provided with other switches and operation members, and may be provided with optical members and drive units for the optical members.

The adapter apparatus 500 may control the communication switch 505 as required to perform communication between the communication units 502 and 210. In this case, status of the communication switch 505 is transmitted from the communication unit 502 to the communication unit 210.

The above-described configurations, the exemplary embodiments of the disclosure can provide a lens apparatus, an imaging apparatus body, an imaging apparatus, and a program which are beneficial in implementing the compatibility with the conventional apparatus (model) and an expanded function of the imaging apparatus. In the above-described examples, information transmitted from the lens apparatus 100 to the imaging apparatus body 200 is updated based on the configuration of the imaging apparatus. However, information transmitted from the imaging apparatus body 200 to the lens apparatus 100 may be updated based on the configuration. The disclosure is not limited to a configuration the adapter apparatus 500 that has an expanded function and updates the lens apparatus information. The interchangeable lens apparatus 100 may have an expanded function, and the adapter apparatus 500 may update the lens apparatus information. For example, in a case where the lens apparatus 100 is not configured to operate in the power saving mode, the adapter apparatus 500 may have the function of the power control unit 142 and perform a drive limitation in response to a driving command from the communication unit 210. In this way, the adapter apparatus 500 may carry out the function expansion in the imaging apparatus in lieu of or in addition to the lens apparatus 100.

The communication method of the communication unit 140 may be different from that of the communication unit 210, and the adapter apparatus 500 may perform conversion between the two communication methods. In this case, for example, the communication unit 502 can communicate with the communication unit 140 based on a first communication method and communicate with the communication unit 210 based on a second communication method.

A fourth exemplary embodiment is described. At least one function of the above-described exemplary embodiments can also be realized by a program for implementing the at least one function. The program may be supplied to an apparatus or a system via a network or a storage medium, and then read and executed by at least one processor in a computer of the apparatus or the system. The function can also be realized by a circuit (for example, an application specific integrated circuit (ASIC)) for implementing the function.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-112968, filed Jul. 7, 2021, which is hereby incorporated by reference herein in its entirety.

What is claimed is:

1. A lens apparatus detachably attached to an image pickup apparatus, the lens apparatus comprising:

an optical member; and a controller configured to perform communication with the image pickup apparatus with respect to driving of the optical member, wherein the controller is configured to receive first information for identifying the image pickup apparatus transmitted from the image pickup apparatus, and transmit second information for identifying the lens apparatus to the image pickup apparatus; and wherein the controller is configured to receive a change confirmation information transmitted from the image pickup apparatus according to reception of the second information by the image pickup apparatus, wherein the controller is configured to transmit lens apparatus change information to the image pickup apparatus in response to receiving the change confirmation information, in order to request the image pickup apparatus to transmit third information for identifying the image pickup apparatus based on the first information, wherein the controller is configured to, in response to the third information transmitted from the image pickup apparatus, transmit fourth information for identifying the lens apparatus to the image pickup apparatus, wherein the second information is information that indicates whether the lens apparatus supports a first function or not, wherein the fourth information is information that indicates that the lens apparatus supports the first function, wherein the second information and the fourth information are sent from the same lens apparatus, and wherein the first function is a function related to focusing of the optical member.

2. The lens apparatus according to claim 1, wherein the controller is configured to receive the third information and transmit fourth information that is the second information at least a part of which is changed to the image pickup apparatus.

3. The lens apparatus according to claim 2, wherein the controller is configured to exclusively control a plurality of drive units respectively configured to drive a plurality of optical members based on the fourth information.

4. The lens apparatus according to claim 2, wherein the fourth information includes information about whether the controller is capable of limiting a driving speed of the optical member.

5. The lens apparatus according to claim 1, wherein the first function is a function regarding driving of the optical member by the image pickup apparatus.

6. The lens apparatus according to claim 5, wherein each of the second information and the fourth information includes information about limitation on the driving of the optical member.

7. The lens apparatus according to claim 1, wherein the controller functions as a drive unit configured to drive the optical member based on the third information to perform limitation on the driving of the optical member.

8. The lens apparatus according to claim 1, further comprising:

a movable optical member configured to reduce an image blur, wherein the controller further functions as a limiting mechanism configured to perform limitation on the driving of the optical member, and wherein the controller is configured to control, based on the third information, the limitation on the driving of the optical member with the limiting mechanism.

9. The lens apparatus according to claim 1, wherein the optical member includes at least one of a lens unit movable for zooming, a lens unit movable for focusing, a lens unit movable for reducing an image blur, or an aperture stop.

10. The lens apparatus according to claim 1, further comprising:

wherein the lens apparatus is detachably attached between an interchangeable lens apparatus detachably attached to the image pickup apparatus and the image pickup apparatus, and wherein the controller is configured to perform communication with the interchangeable lens apparatus and the image pickup apparatus with respect to the driving of the optical member.

11. The lens apparatus according to claim 10, further comprising an optical member disposed on an optical path between the interchangeable lens apparatus and the image pickup apparatus.

12. A pickup system comprising:

the lens apparatus according to claim 1; and an image pickup apparatus, wherein the image pickup apparatus includes an image pickup element configured to pick up an image formed via the lens apparatus.

13. The lens apparatus according to claim 1, wherein in a case where a command included in the first information satisfies a condition, transmission of the third information is requested, and wherein in a case where the command included in the first information does not satisfy the condition, transmission of the third information is not requested.

14. The lens apparatus according to claim 1, wherein the first information and the third information are information including a same content.

15. An image pickup apparatus to which a lens apparatus is detachably attached, the image pickup apparatus comprising:

a controller configured to perform communication with the lens apparatus with respect to driving of an optical member; and to pick up an image formed via the lens apparatus, wherein the controller is configured to transmit first information for identifying the image pickup apparatus to the lens apparatus and receive second information for identifying the lens apparatus from the lens apparatus, and wherein the controller is configured to transmit a change confirmation information to the lens apparatus in response to receiving the second information from the lens apparatus, wherein the controller is configured to transmit third information for identifying the image pickup apparatus to the lens apparatus in response to receiving lens apparatus change information from the lens apparatus, wherein the controller is configured to receive fourth information for identifying the lens apparatus, wherein the second information is information that indicates whether the lens apparatus supports a first function or not, wherein the fourth information is information that indicates that the lens apparatus supports the first function, wherein the second information and the fourth information are sent from the same lens apparatus, and wherein the first function is a function related to focusing of the optical member.

16. A pickup system comprising:

the image pickup apparatus according to claim 15; and a lens apparatus detachably attached to the image pickup apparatus.

17. A non-transitory storage medium storing a program for causing a computer to execute a method of communication with an image pickup apparatus, the method being performed by a lens apparatus detachably attached to the image pickup apparatus with respect to driving of an optical member, the method comprising:

receiving first information for identifying the image pickup apparatus transmitted from the image pickup apparatus, and transmitting second information for identifying the lens apparatus to the image pickup apparatus, and receiving a change confirmation information transmitted from the image pickup apparatus according to reception of the second information by the image pickup apparatus, transmitting lens apparatus change information to the image pickup apparatus in response to receiving the change confirmation information, in order to request the image pickup apparatus to transmit third information for identifying the image pickup apparatus;

transmitting fourth information, in response to the third information transmitted from the image pickup apparatus, for identifying the lens apparatus to the image pickup apparatus, wherein the second information is information that indicates whether the lens apparatus supports a first function or not, wherein the fourth information is information that indicates that the lens apparatus supports the first function, wherein the second information and the fourth information are sent from the same lens apparatus, and wherein the first function is a function related to focusing of the optical member.

18. A non-transitory storage medium storing a program for causing a computer to execute a method of communication with a lens apparatus, the method being performed by an image pickup apparatus to which the lens apparatus is detachably attached with respect to driving of an optical member, the method comprising:

transmitting first information for identifying the image pickup apparatus to the lens apparatus, and receiving second information for identifying the lens apparatus from the lens apparatus, transmitting a change confirmation information to the lens apparatus in response to receiving the second information from the lens apparatus, transmitting third information for identifying the image pickup apparatus to the lens apparatus in response to receiving lens apparatus change information from the lens apparatus;

receiving fourth information for identifying the lens apparatus, wherein the second information is information that indicates whether the lens apparatus supports a first function or not, wherein the fourth information is information that indicates that the lens apparatus supports the first function, wherein the second information and the fourth information are sent from the same lens apparatus, and wherein the first function is a function related to focusing of the optical member.

* * * * *